(12) United States Patent
Guralnik et al.

(10) Patent No.: US 7,778,943 B2
(45) Date of Patent: Aug. 17, 2010

(54) STOCHASTIC EVIDENCE AGGREGATION SYSTEM OF FAILURE MODES UTILIZING A MODIFIED DEMPSTER-SHAFER THEORY

(75) Inventors: Valerie Guralnik, Orono, MN (US); Dinkar Mylaraswamy, Saint Anthony, MN (US)

(73) Assignee: Honeywell International Inc., Morristown, NJ (US)

( * ) Notice: Subject to any disclaimer, the term of this patent is extended or adjusted under 35 U.S.C. 154(b) by 650 days.

(21) Appl. No.: 11/765,048

(22) Filed: Jun. 19, 2007

(65) Prior Publication Data

US 2008/0195572 A1 Aug. 14, 2008

Related U.S. Application Data

(60) Provisional application No. 60/888,997, filed on Feb. 9, 2007.

(51) Int. Cl.
*G06F 15/18* (2006.01)
*G06F 19/00* (2006.01)
(52) U.S. Cl. ...................................... 706/12; 702/116
(58) Field of Classification Search .................. 706/11, 706/12, 47; 702/116, 69, 75–76; 324/614
See application file for complete search history.

(56) References Cited

U.S. PATENT DOCUMENTS 6,944,566 B2 * 9/2005 Chen et al. ................. 702/116

OTHER PUBLICATIONS

Chin et al., "Failure mode and effects analysis by data envelopment analysis", Decision Support Systems, 48 (2008), pp. 246-256.*
Guralnik et al., "On Handling Dependent Evidence and Multiple Faults in Knowledge Fusion for Engine Health Management," IEEEAC paper #1136, 9 pages, 2002.
Shafer, "A Mathematical Theory of Evidence,"Princeton University Press, 161 pages, 1976.
Shafer, "Perspectives on the Theory and Practice of Belief Functions,"International Journal of Approximate Reasoning, vol. 4, No. 1, pp. 323-362, Jan. 1990.

* cited by examiner

*Primary Examiner*—Donald Sparks
*Assistant Examiner*—Ola Olude Afolabi
(74) *Attorney, Agent, or Firm*—Crompton Seager & Tufte LLC

(57) ABSTRACT

A system for obtaining diagnostic information, such as evidence about a mechanism, within an algorithmic framework, including filtering and aggregating the information through, for instance, a stochastic process. The output may be an overall belief value relative to a presence of an item such as, for example, a fault in the mechanism.

13 Claims, 21 Drawing Sheets

| Element | Count |
|---|---|
| Components | 121 |
| Fault Modes | 410 |
| Algorithms | 37 |
| Measurements | 21 |
| Features | 11 |

*Figure 6*

| Scenario | Supporting Alg Index | Discounting Alg Index |
|---|---|---|
| 1. Hot section degradation – trend based | 2 10 21 | 9 11 |
| 2. Hot section degradation – jump based | 1 2 10 21 | 9 11 |
| 3. Hot section degradation – fp suppression | 11 | 2 10 21 |
| 4. Hot section alg cba – simple clustering | 2 10 21 22 | 9 11 |
| 5. Hot section alg cba – complex clustering | 2 10 21 22 | 9 11 |
| 6. Multiple fault hypothesis – debris and cooler | 19 24 | 3 5 |
| 7. Multiple fault hypothesis – gen and starter | 7 20 27 | 9 |
| 8. Dependent evidences – scv | 13 14 15 | |
| 9. Dependent evidences – starter | 9 10 12 27 | |

*Figure 7*

| Sensor Name | Index | Noise std* | Sensor Name | Index | Noise std* |
|---|---|---|---|---|---|
| alt | 1 | 1 | lcv-pos | 11 | 2 |
| DP | 2 | 3 | LOP | 12 | 1 |
| EGT | 3 | 5 | LOT | 13 | 2 |
| GLA | 4 | 1 | N | 14 | 2 |
| HOT | 5 | 3 | P2 | 15 | 5 |
| IGV | 6 | 2 | PT | 16 | 4 |
| igv_cmd | 7 | 3 | SCV | 17 | 4 |
| LCDT | 8 | 3 | scv_cmd | 18 | 3 |
| LCIT | 9 | 3 | SMELL | 19 | 6 |
| lcv_cmd | 10 | 3 | STA | 20 | 2 |
| T2 | 21 | 5 | | | |

* Expressed in % of full scale.

*Figure 9*

| Scenario | Stoch | DS |
|---|---|---|
| Only Fault 4 present | [4] 0.90<br>[1] 0.02<br>[2] 0.03 | [4] 0.73<br>[2] 0.09<br>[1] 0.09 |
| Fault 4 & 7 present | [4] 0.36<br>[4 7] 0.35<br>[7] 0.33 | [4] 0.52<br>[7] 0.38<br>[1] 0.03 |
| Fault 4 & 11 present | [4] 0.36<br>[4 11] 0.33<br>[11] 0.30 | [4] 0.57<br>[11] 0.31<br>[1] 0.03 |
| Fault 4 & 7 & 11 present | [4] 0.24<br>[7] 0.22<br>[4 7 11] 0.22 | [4] 0.39<br>[7] 0.28<br>[11] 0.21 |

*Figure 15*

| Scen | Number of faults | Max combinations | \|x\| | $\zeta_3$ |
|---|---|---|---|---|
| 1 | 10 | 175 | 18 | 0.103 |
| 2 | 10 | 175 | 18 | 0.103 |
| 3 | 7 | 63 | 16 | 0.254 |
| 4 | 10 | 175 | 18 | 0.103 |
| 5 | 10 | 175 | 18 | 0.103 |
| 6* | 6 | 41 | 12 | 0.293 |
| 7* | 10 | 175 | 17 | 0.097 |
| 8 | 4 | 14 | 4 | 0.286 |
| 9 | 9 | 129 | 15 | 0.116 |
| Average | | | | 0.16 |

*Contain multiple faults

*Figure 16*

| Scen | $\zeta_1$ | | | | | | | |
|---|---|---|---|---|---|---|---|---|
| | $\phi = 0$ | | $0.02 < \phi < 0.1$ | | $0.1 < \phi < 0.1$ | | $0.1 < \phi < 0.2$ | |
| | Stoch | DS | Stoch | DS | Stoch | DS | Stoch | DS |
| 1 | 92.9 | 100 | 86.0 | 96.5 | 79.0 | 85.0 | | |
| 2 | 100.0 | 100 | 97.8 | 100 | 89.9 | 100 | | |
| 3 | 96.0 | 100 | 77.2 | 80.4 | 74.70 | 75.9 | | |
| 4 | 92.3 | 100 | 89.7 | 100 | 84.5 | 97.2 | | |
| 5 | 100 | 100 | 93.9 | 100 | 88.9 | 100 | | |
| 6* | 95.0 | 0.0 | 94.0 | 0.0 | 87.0 | 0.0 | | |
| 7* | 98.0 | 0.0 | 92.0 | 0.0 | 90.0 | 0.0 | | |
| 8 | 100 | 100 | 95.0 | 63.4 | 89.5 | 0.00 | | |
| 9 | 100 | 100 | 100 | 100 | 100 | 100 | | |
| Avg | 97.13 | 77.78 | 91.73 | 71.14 | 87.06 | 62.01 | | |

* Contain multiple faults

*Figure 17*

| Scen | $\varsigma_2 \times 10^2$ | | | | | |
|---|---|---|---|---|---|---|
| | $\phi = 0.02$ | | $\phi = 0.1$ | | $\phi = 0.2$ | |
| | Stoch | DS | Stoch | DS | Stoch | DS |
| 1 | 0.93 | 4.34 | 1.86 | 7.95 | 2.50 | 11.31 |
| 2 | 0.85 | 4.41 | 1.83 | 8.28 | 2.58 | 11.00 |
| 3 | 0.98 | 4.35 | 2.08 | 8.61 | 2.92 | 11.62 |
| 4 | 0.82 | 4.35 | 1.74 | 8.36 | 2.47 | 11.46 |
| 5 | 0.79 | 4.62 | 1.67 | 8.81 | 2.34 | 11.39 |
| 6* | 0.91 | n/a | 1.98 | n/a | 2.56 | n/a |
| 7* | 0.83 | n/a | 1.78 | n/a | 2.42 | n/a |
| 8 | 0.98 | 4.46 | 1.76 | 11.33 | 2.86 | 18.40 |
| 9 | 1.85 | 4.14 | 4.60 | 12.46 | 6.59 | |
| Avg | 0.99 | 4.38 | 2.14 | 9.40 | 3.04 | 12.53 |

\* Contain multiple faults

STOCHASTIC EVIDENCE AGGREGATION SYSTEM OF FAILURE MODES UTILIZING A MODIFIED DEMPSTER-SHAFER THEORY

This application claims the benefit of a U.S. Provisional Application No. 60/888,997, filed Feb. 9, 2007.

U.S. Provisional Application No. 60/888,997, filed Feb. 9, 2007, is hereby incorporated by reference.

BACKGROUND

The present invention pertains to obtaining various pieces of information, and particularly it pertains to the obtaining the information with an algorithmic framework. More particularly, the invention pertains to aggregation of the various pieces of information.

SUMMARY

The invention is a system for obtaining diagnostic information, such as evidence, with an algorithmic framework, including filtering and aggregating the information through, for instance, a stochastic process. The output may be a belief value relative to time of a presence of an item such as, for example, a fault in a mechanism.

BRIEF DESCRIPTION OF THE DRAWING

FIG. 6 shows a table of elements of the model noted in FIG. 5;

FIG. 7 shows a table of scenarios from a predictive trend monitoring program used for testing against with evidence aggregation;

FIG. 9 has a table which lists sensors and corresponding noise information for use in a simulator;

FIG. 15 shows a table of scenarios showing a comparison of the Dempster-Shafer and stochastic fusion approaches;

FIG. 16 shows a table of the complexity metric for various scenarios;

FIG. 17 shows a table listing an accuracy metric for various scenarios and comparing the stochastic based fusion with the Dempster Shafer based fusion;

FIG. 18 shows a table showing a variability metric for the stochastic and Dempster Shafer based fusions in view of various scenarios.

DESCRIPTION

Figure 1:
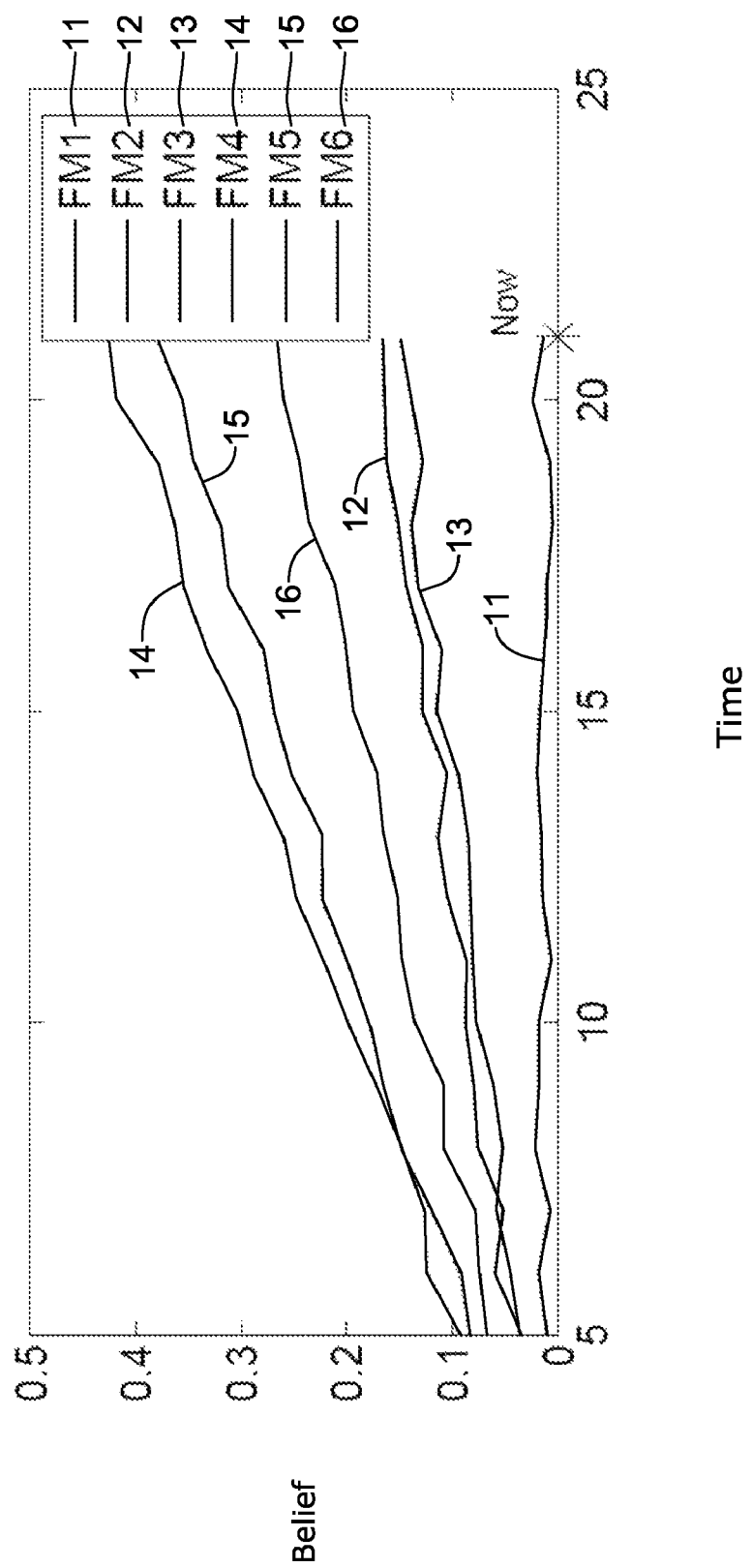
FIG. 1 is a diagram of belief versus time to the present for various failure modes of a mechanism.

Many decision support systems may rely on a series of algorithms that provide supporting evidence towards a specific conclusion. Architectures that combine outputs from multiple algorithms may be attempted under the guise of knowledge fusion or evidence aggregation. A basic premise of such approaches is to combine conclusions from multiple algorithms to achieve desired levels of accuracy. Dempster's theory of aggregation provides a practical solution using upper and lower probability bounds—minimizing the penalty of specifying all conditional probabilities used by a Bayesian belief network. Various heuristic extensions may be offered to handle the following limitations, albeit not necessarily with success. First, some evidence aggregation theories do not appear to handle causal relationships between conclusions, such as those arising in cascading fault situations. Second, aggregation appears essentially static and thus previous evidence would be ignored. In many domains, the causal relationship between hypotheses appears very strong. In fact, ignoring them may lead to incorrect conclusions. There appears a need to develop an approach for evidence aggregation that will handle the noted limitations. To this end, an aggregation theory may be developed based on stochastic processes and thus overcome the limitations.

The aggregation issue may be viewed partially as a Markov process. An overall belief $\vec{x}(t)$ may be modeled as a known, but unobservable state evolving in a linear state space. A probability of cascading faults, if known, may be incorporated within a state transition matrix. An incomplete universe may be modeled as an unknown state with unknown dynamics. A diagnostic algorithm may provide a noisy observation for the hidden states. Diagnostic aggregation may be equivalent to an estimation problem—where one may be estimating the hidden state $\vec{x}(t)$ evolving in a partially known state space using multiple noisy observations $Y_{A_j}(t)$. In a solution approach, one may handle these two elements through two coupled steps. One may be filtering. In this step, one may handle the noise associated with evidence provided by various diagnostic algorithms. Since the diagnostic state space $\vec{x}$ appears larger than the algorithm expertise, only the relevant states would be updated. One may use a Kalman filter approach to handle the noise and update the noise covariance matrices. Another may be aggregation. In this step, one may handle the partial overlap associated with the evidence. In other words, one may aggregate the smooth updates from the various diagnostic algorithms.

The present invention may be at least in part a mechanism for aggregating evidence provided by diagnostic algorithms. One may assume that the output from a diagnostic algorithm is a stochastic realization of the underlying failure mechanism. In other words, diagnostic algorithms may provide a noisy and incomplete view (i.e., partially known) of the diagnostic state. As an example, weather channels may provide partial observations of the true weather. The information may be noisy because the weather instruments have an inherent noise. This noise level may be reflected in the observation provided by the weather channel.

A machine could fail in 200 different ways but a diagnostic algorithm may be able to provide observation for only one failure mode (FM) or 5 failure modes. There may be noise because the pertinent sensors are noisy.

The "what" here may be an approach for aggregating such information and deriving at a diagnostic state of the machine or system under consideration. The "how" is the using a theory of filtering and aggregation for getting an estimate of this diagnostic state using successive observations from these diagnostic algorithms. The Bayesian theory may be used for conflict resolution. Alternatively simple averaging scheme can also be used. One may have diagnostic aggregation or fusion which could be an overlap of two algorithms. If one algorithm has a 70 percent level of confidence and the other has a 30 percent level of confidence of a broken blade, then there may be an overall weighted average that is an 80 percent level of confidence about the broken blade; however, the level may still be less than 100 percent.

Figure 2:
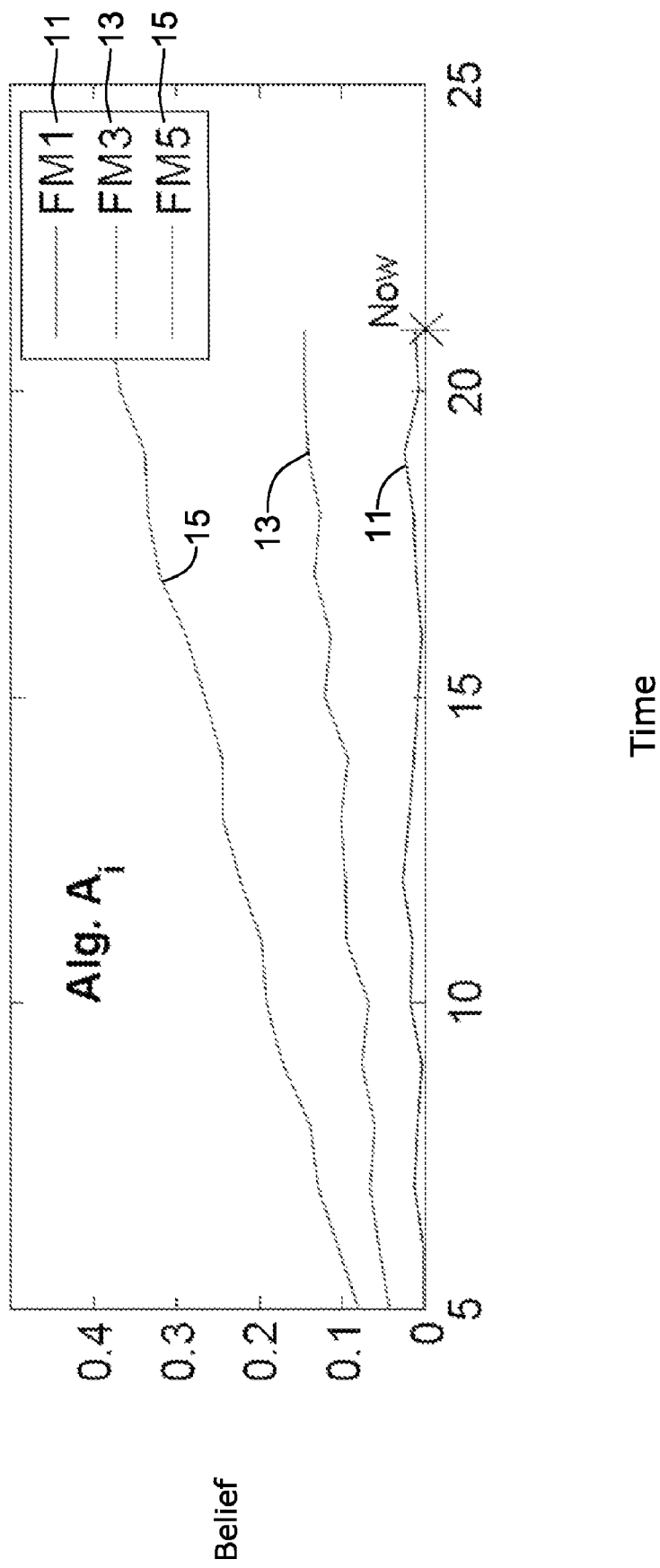
FIGS. 2 and 3 are portions of the diagram of FIG. 1 according to certain algorithms, respectively.
Figure 3:
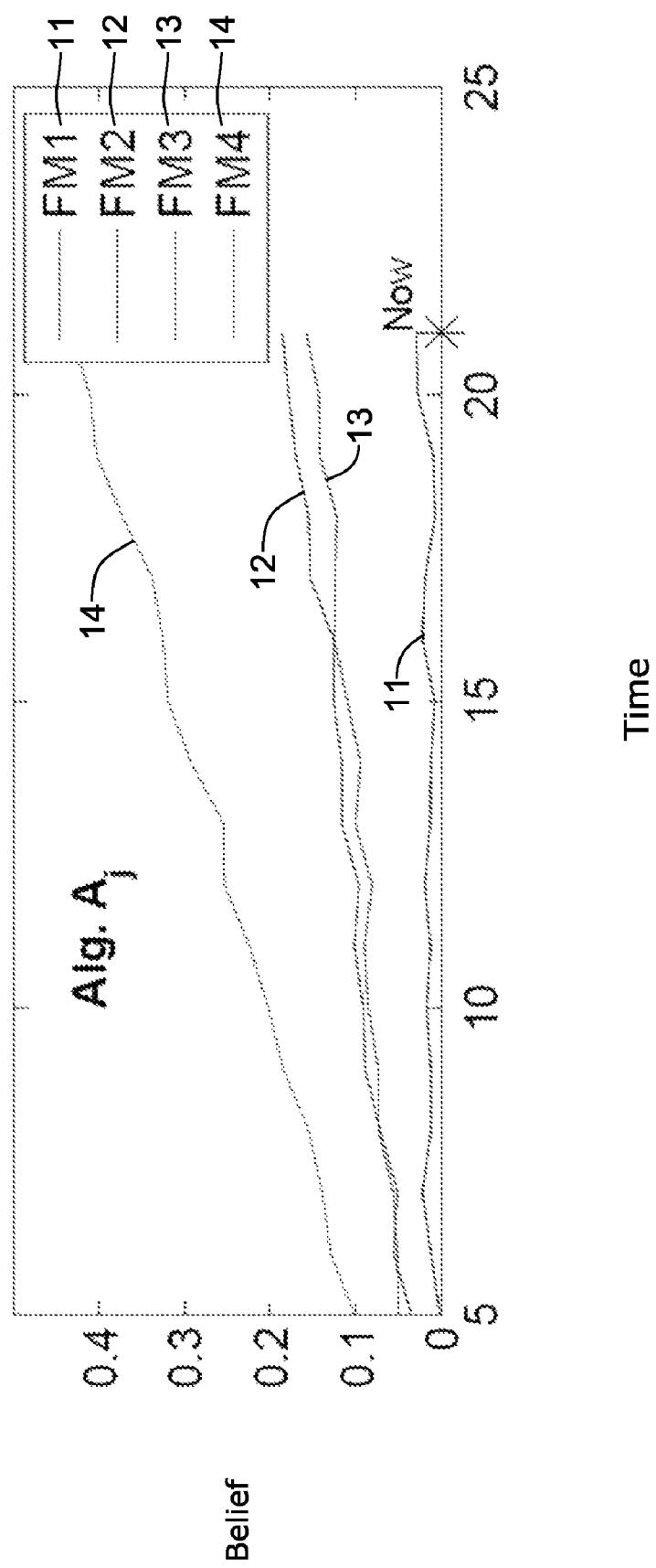

FIG. 1 is a graph that relates to a diagnostic algorithm of a jet engine. This algorithm may know of six failure modes out of a possible 200 failure modes of the engine and hence provides partial observations. At the five unit point of time there may be a 0.1 belief (i.e., a confidence level) in one of the failure modes (viz., failure mode 4 (FM4)) though the belief may be less for the other failure modes. In the graph of FIG. 2, there may be a zero belief in the failure mode 4, in that belief in this mode does not appear in the graph. In FIG. 3, the highest belief may be in the fourth failure mode diagnostics output at the various points in time.

For instance, there may be two algorithms, $A_i$, $A_j$, reflecting different beliefs according to FIGS. 2 and 3, respectively. The weighted average approach may provide a fusion or aggregation of the beliefs provided by the algorithms to come up with one resultant belief. There may be obtained an overall or common belief value over time. The Kalman filter may be used to come up with a smooth value of the belief. A feature of the present invention is coming up with a common belief of the two algorithms over a certain period of time.

Figure 4A:
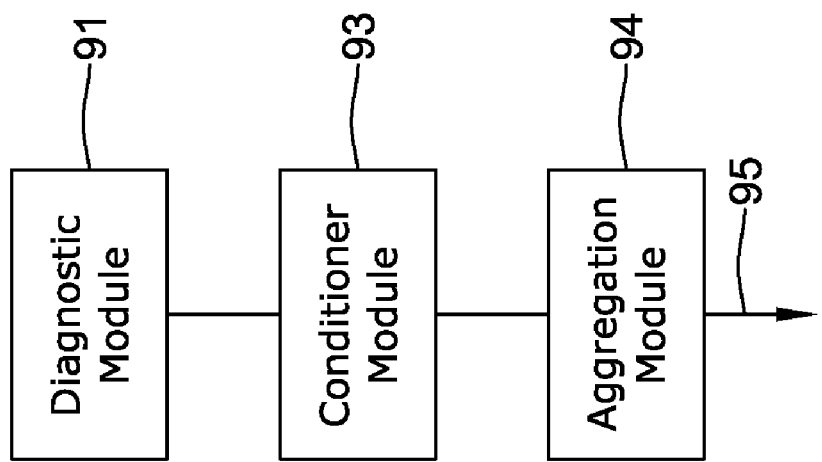
FIG. 4a is a basic block diagram of the present system.

FIG. 4a is a block diagram of the present system. A diagnostic module 91 may have an output connected to a conditioner module 93. An output of module 93 may go to an aggregation module 94. Module 94 may provide an output 95 which may be a diagnostic state relative to time. Module 93 may be a filter such as a Kalman filter. The aggregation may be that of a weighted average type of fusion.

Figure 4B:
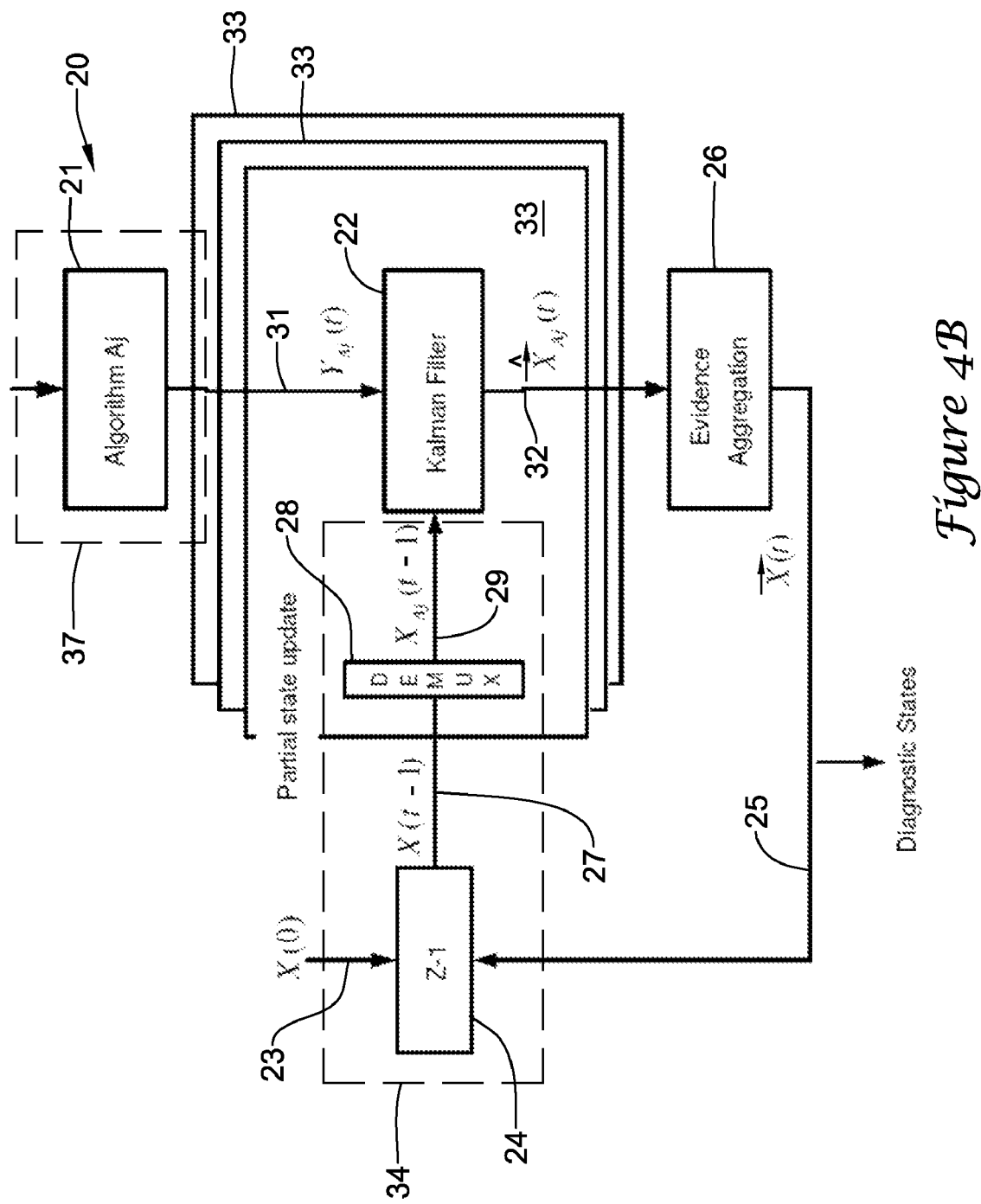
FIG. 4b is a diagram of an overview of the present approach.

FIG. 4b is a diagram of an overall approach of the present system. The Kalman filter 22 may take into account most or all of the available history in a system 20 as illustrated in FIG. 4b. The Kalman filter approach may be used to handle the noise and update noise covariance matrices. The Kalman filter is an illustrative example in that another kind of filter may be used. A diagnostic module 34 may have an output connected to filter 22 and a prognostic module 37 may have an output connected to the filter 22. System 20 illustrates an example of the present approach. Module 37 may include a diagnostic algorithm module 21. Module 34 may include a delay operator 24 which is Z−1 and a demultiplexer 28. Also, entering delay operator 24 may be an input $\vec{x}(t)$ which includes diagnostic states 25 from an evidence aggregation module 26. An initial diagnostic state 23, which is $\vec{x}(0)$, may go to the delay operator 24. This input 23 is also called as the initial values for the diagnostic states. Module 26 may effectively provide an output 25 of system 20, which is the diagnostic states for the entire system.

An output 27, $\vec{x}(t-1)$, from delay operator module 24 may go to the demultiplexer 28. $\vec{x}(t-1)$ may indicate a delay of one time unit (e.g., a minute, hour, day, or the like). Demultiplexer 28 may relate to an algorithm $A_j$, which need only see a part of a state. The algorithm $A_j$ may see, for example, only five failure modes even though there may be 200 ways of breakage or failure modes of the mechanism at issue, such as an engine. The demultiplexer 28 may provide a selective operation by, for example, letting just the five failure modes and/or information about them through as an output 29, $\vec{x}_{A_j}(t-1)$, to the Kalman filter 22. $\vec{x}_{A_j}(t-1)$ may be a value of the state from the immediately previous calculation when t>1 or it may be X(0) when t=0. It may be the overall belief calculated from the previous step of evidence aggregation 26. The demultiplexer 28 may provide a selective operation by selecting only the belief values for only the fibe failure modes pertaining to the diagnostic algorithm $A_j$.

Diagnostic algorithm $A_j$ may do its own process. The algorithm could be a processing mechanism that comes up new observations for the belief in these five failure modes, signal $\vec{y}_{A_j}(t)$ respectively. This observation provides an input 31 to the Kalman Filter. As an example, the belief values for five diagnostic states from the previous calculation may be 0.1, 0.02, 0.0, 0.6, 0.01. This previous values provides input 29 to the Kalman Filter. At time t, the Diagnostic Algorithm Aj may provide a new set of belief for only these five failure modes based on its internal processing module 21. The Kalman filter receives noisy observations 31 such as 0.2, 0, 0, 0.5, 0.3. The Kalman filter thus receives two inputs: input 28 which is the belief for the five diagnostic states from a previous calculation, and input 31 which is the belief provided by Algorithm Aj during the current calculation time. These two inputs are processed by block 22 to generate a new set of values for the belief in only these five diagnostic states. This output 32 $\vec{x}_{A_j}(t)$ will be an updated belief value for only the five diagnostic states. An output 32, $\vec{x}_{A_j}(t)$, may go from the Kalman filter 22 to the evidence aggregation module 26.

There may be more algorithms that do a similar operation but for different failure modes, yet a union of the failure modes is within a total 200 failure mode super set. This is illustrated in FIG. 4b using layers 33. Each layer corresponds to one Diagnostic Algorithm, each layer consisting of module 21 that provides providing signal 31, module 28 that selects relevant belief values from the previous calculations and a Kalman Filter block 22. Each layer may provide a partial state update, signal 32 corresponding to the failure modes that the diagnostic algorithm Aj is aware of. The output provided by several layers 33 may be partially overlapping but the union of all outputs may not exceed the 200 failure modes for the system. There could be, for instance, five algorithms from five layers, respectively, providing individual beliefs on one failure mode such as dirt in a pipe. But each algorithm could have beliefs on several failure modes but not necessarily the same failure modes as the other four algorithms.

Figure 4C:
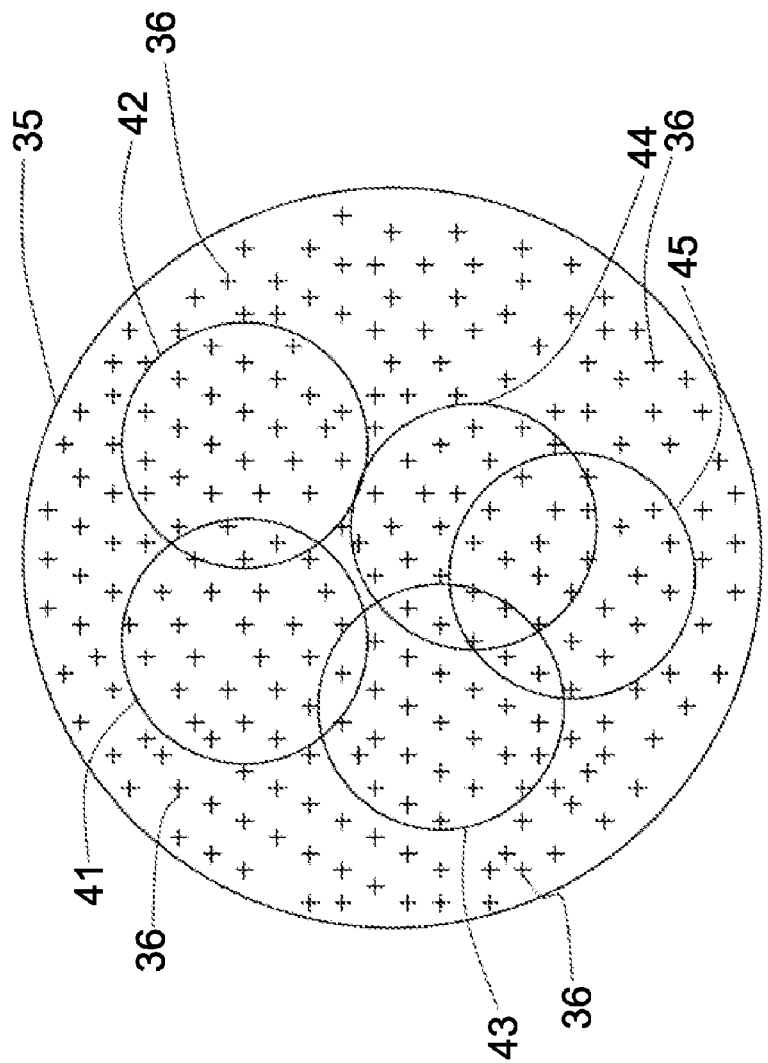
FIG. 4c is a diagram of a set of failure modes showing various areas of coverage by algorithms of the modes.

FIG. 4c shows a diagram of the 200 failure modes 36, i.e., the super set, for the system being observed within a circle 35. The failure modes 36 may be represented by "+"s in the circle 35. Each of the failure modes 36 may be different from one another. Algorithms 1, 2, 3, 4 and 5 may be represented by circles 41, 42, 43, 44 and 45, respectively, in circle 35. An overlap of two or more algorithm circles may cover one or more failure modes 36 common to the respective algorithms. The algorithms here appear not to be exhaustive as to covering all of the failure modes, as each of the algorithms covers just certain failure modes. For illustrative purposes, the present discussion shows algorithms covering less failure modes 36 than shown in FIG. 4c. There are a number of $\vec{x}_{A_j}(t)$ values, one for each layer 33, for all of $A_j, \in \{A_j\}$, where the latter represents algorithm sets.

$$\hat{\vec{x}}_{A_1}(t)$$

$$\hat{\vec{x}}_{A_2}(t)$$

$$\hat{\vec{x}}_{A_3}(t)$$

$$\vdots$$

$$\hat{\vec{x}}_{A_n}(t)$$

The "n" number of noted items of evidence relative to the algorithms may be aggregated. These items may be fused using the Dempster Shafer or another approach. $\vec{x}_{A_i}$ and $\vec{x}_{A_j}$ may have several common trajectories of the trajectories 11, 12, 13, 14 and 15 shown in FIGS. 2 and 3 of the respective failure modes which are similarly designated. There may be a range or an expertise covered by a particular algorithm. The updates $\vec{x}_{A_1}, \vec{x}_{A_2}, \vec{x}_{A_3}, \ldots, \vec{x}_{A_n}$, corresponding to the respective algorithms, may be fused resulting in one vector $\vec{x}(t)$.

For each different failure mode, one may get one belief number or value. Thus, there may be nine belief numbers from an algorithm for nine different failure modes. One specific failure mode, dirt in a pipe, viz., a pipe failure, may be covered by five algorithms having five belief numbers which result in one belief number for that particular failure mode. However, there may be more or less 120 failure modes 36 in circle 35 outside the algorithm coverage. These failure modes may be regarded as unknown and are not to be considered separately as they are covered by an algorithm but may be considered collectively as one entity as represented by $\theta_o$.

The evidence aggregation module 26 in system 20 of FIG. 4b may pull the information 32, $\vec{x}_{A_1 \text{ through } n}(t)$, from filter 22 together for the "n" various layers 33, to provide an estimated diagnostic state(s) 25, $\vec{x}(t)$, of the system 20. The hat "^" of $\hat{x}(t)$ may be dropped (resulting in x(t)), or it may be retained, when doing evidence aggregation. At the output of module 26, one may get a diagnostic state of the system at time (t) which goes back into the entire calculation at the next time step. Then time may change and the process may be repeated for each step of time. Thus, $\vec{x}(t)$ or $\vec{x}(t)$ may be plotted.

Figure 14:
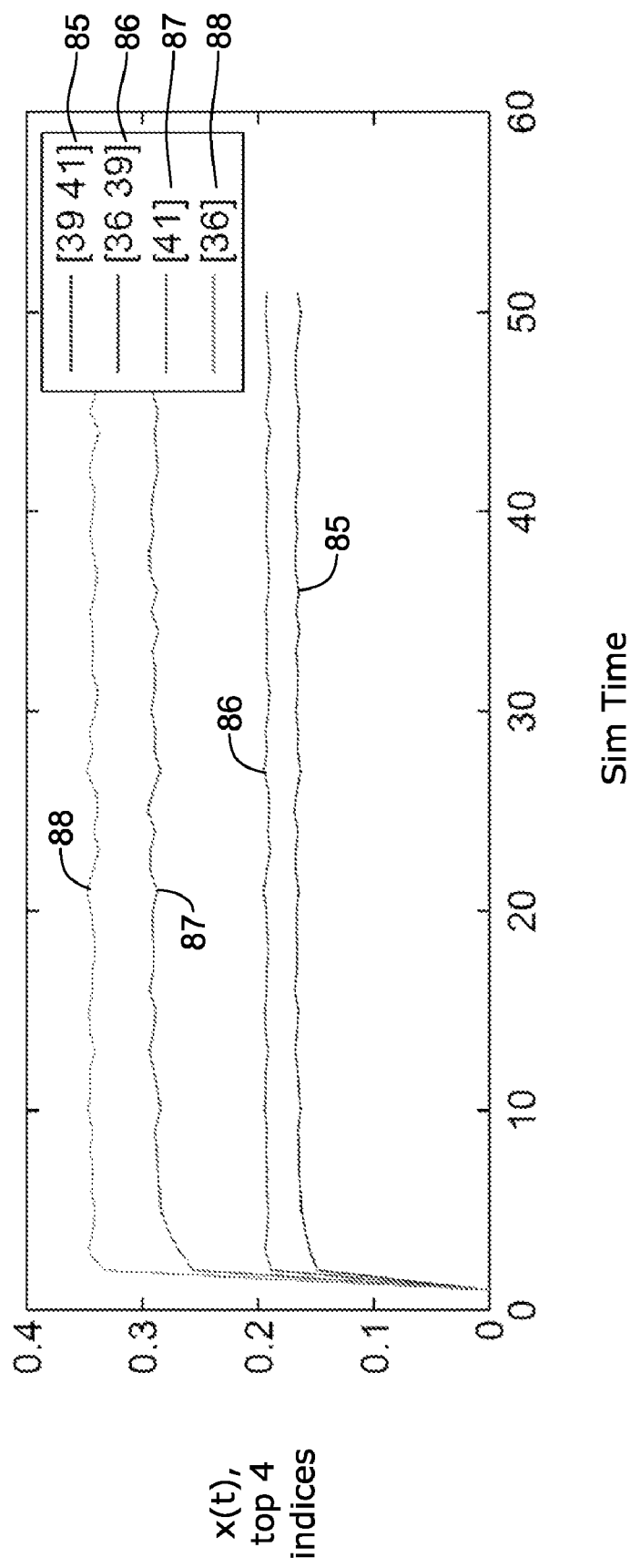
FIG. 14 shows time traces of a stochastic fusion output relative to certain failure modes.
Figure 19:
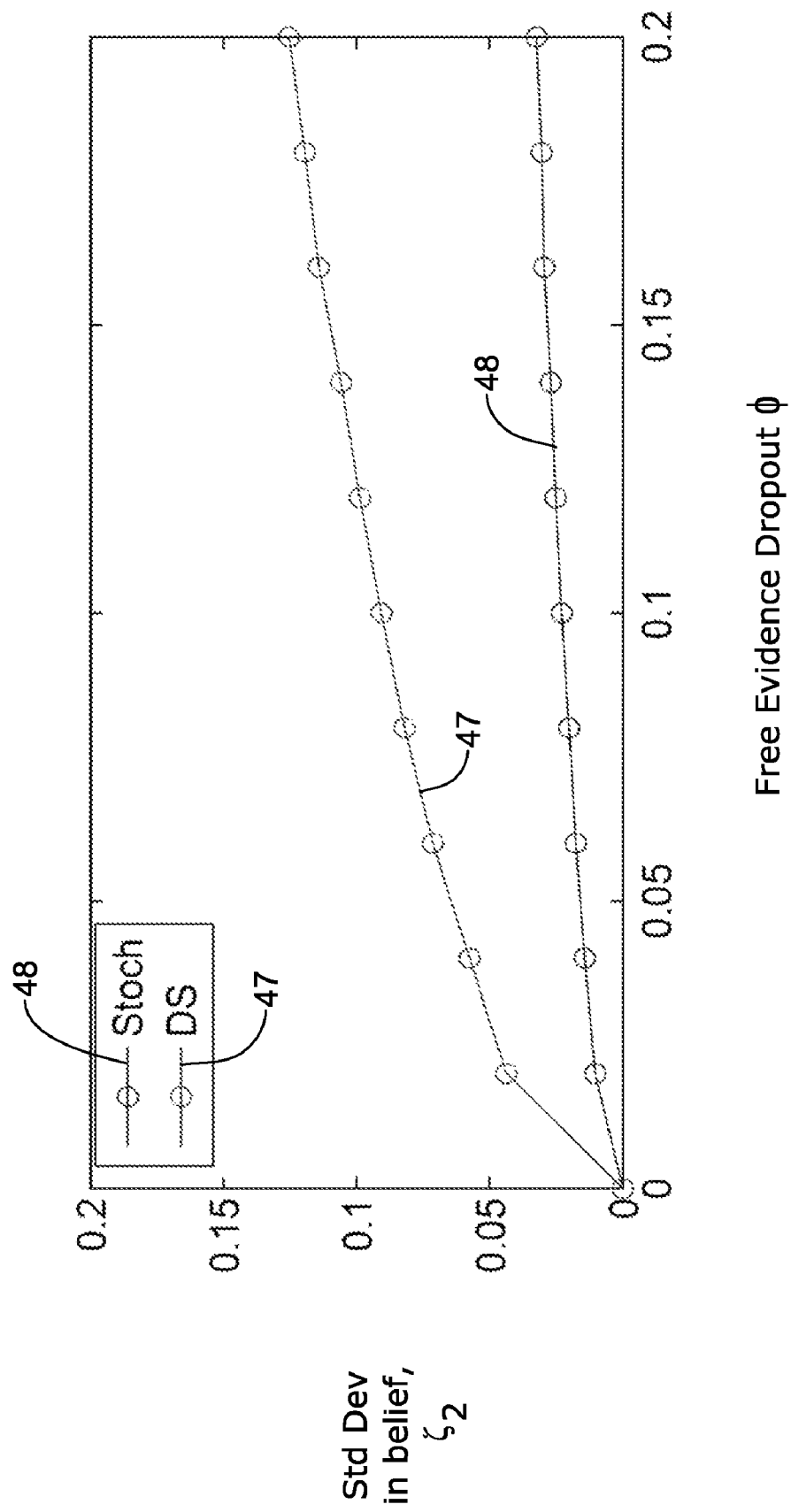
FIG. 19 is a graph of the variability metric as a function of evidence dropout for stochastic and Dempster Shafer based fusions.

FIGS. 10-13 show the $Y_{A_i}(t)$ (relative to engine cycles) of the input 31 to filter 22 in FIG. 4b. FIG. 14 shows plots after the fusion of $\vec{x}(t)$ (relative to simulation time) for certain failure modes. FIGS. 10-13 reveal a raw input and FIG. 14 shows the output after processing. As to the [39 41] trace 85 in FIG. 14 where the failure modes are together, the relevant algorithm could not distinguish between these failure modes. There may be missing evidence and yet there is an output since the aggregation is robust. FIG. 19 shows a standard deviation in belief, $\zeta_2$, of 0.05 where about one percent of the evidence is missing. A 10 to 15 percent dropout of sensors may be normal for the state of the art. One may note in FIG. 19 that the curve 47 representing the Dempster Shafer fusion standard deviation in belief, $\zeta_2$, rises significantly with an increase of free evidence dropout, $\phi$. The curve 48 representing the Stoch fusion standard deviation in belief, $\zeta_2$, rises significantly less than curve 47 with the increase of free evidence dropout, $\phi$. The lower curve 48 which shows a smaller deviation in belief which is more favorable since it is desired that performance of the system's evidence aggregation be stable.

The issue of evidence aggregation may arise in fault diagnosis using multiple classifiers and decision making using multiple experts. With this issue, one may be given a set of failure hypotheses H and a set of algorithms A. At each time t, each algorithm $a_j \in A$ provides evidence $y_{a_j}(t)$, which assigns a measure of belief to elements in H. The theory of evidence aggregation provides a mechanism for calculating an overall belief $\vec{x}(t)$ for each element in H at time t. Presented here is a theory for evidence aggregation. In this theory, the aggregation problem is formulated as an estimation/filtering problem. The aggregation problem is viewed as a partially known Markov process. Overall belief $\vec{x}(t)$ is modeled as a known, but unobservable state evolving in a linear state space. Diagnostic algorithm $a_j$ provides noisy observation $Y_{a_j}(t)$ for the hidden states $\vec{x}(t)$. One may demonstrate the performance of the present approach with respect to its accuracy and variability under conditions of sensor noise and diagnostic algorithm drop-out. Further, one may provide empirical evidence of convergence and managing the combinatorial complexity associated with handling multiple fault hypotheses.

As indicated herein, the aggregation issue may be viewed as a partially known Markov process. Overall belief $\vec{x}(t)$ may be modeled as a known, but unobservable state evolving in a linear state space. As an example, a system with six known failure modes may be considered. FIG. 1 indicates a belief in a presence of faults modeled as a stochastic process. The Figure illustrates the belief associated with various failure modes over time. Typically, a time axis may be commensurate with the physical system and the rate at which the fault manifests. One may model the belief in the presence of a failure mode as a continuous variable rather than a discrete variable. Further, one may model this variable as a stochastic Markov process. A probability of cascading faults, if known, may be incorporated within the state transition matrix, x(0)=0. An incomplete universe may be modeled as an unknown state with unknown dynamics.

In FIG. 1, a belief relative to six failure modes 11, 12, 13, 14, 15 and 16 (i.e., first through sixth failure modes) are shown over time from, for example, five hours through twenty-one hours, i.e., up to the present time, "Now". Units of such a plot may be other than hours, depending on the starting date and kind of observations desired of the plot.

A diagnostic algorithm $A_j$ may provide noisy observation $e_{a_j}(t)$ for the hidden states $\vec{x}(t)$. An algorithm $A_j$ may provide a noisy observation for a smaller subset of all possible diagnostic states. Similarly, algorithm $A_j$ may provide a belief for an overlapping set of states. FIGS. 2 and 3 illustrate the noisy observation provided by diagnostic algorithms $A_i$, $A_j$. Diagnostic aggregation may be equivalent to an estimation problem—where one is estimating the hidden state $\vec{x}(t)$ evolving in a partially known state space using multiple noisy observations $e_{a_j}(t)$. One may formulate the estimation as a Kalman filtering problem with standard assumptions about state and observation noise.

FIGS. 2 and 3 indicate that diagnostic algorithms may provide noisy and partial realization of the Stochastic process until a present time t. FIG. 2 shows belief provided by algorithm $A_i$ relative to failure modes 11, 23 and 15, relative to the time of five through twenty-one hours (i.e., the present moment). FIG. 3 shows belief provided by algorithm $A_j$ relative to failure modes 11, 12, 13 and 14, relative to the same period of time of FIGS. 1 and 2.

A fusion mechanism 20 is shown in FIG. 4b. The basic premise is that diagnostic algorithm $A_j$ module 21 provides a noisy and partial realization of the underlying stochastic process that describes the belief with respect to various failure modes. In the present approach, these two elements may be handled through two coupled steps. One is filtering. In this step, one may handle the noise associated with evidence provided by various diagnostic algorithms. Since the diagnostic state space x is larger than the algorithm's expertise, just the relevant states are updated. Mathematically, relevant elements of state vector $\vec{x}(t-1)$ at time $t-1$ may be updated using the output from $A_j$ algorithm. That is, a partial $\vec{x}_{A_j}(t)$ may be generated using $\vec{x}(t-1)$ and an algorithm output $Y_{A_j}(t)$. One may use a Kalman filter may be used to handle the noise and update the noise covariance matrices.

The second step may involve handling the partial overlap associated with the various pieces of evidence. In other words, one may aggregate the smooth updates $\vec{x}_{A_j}(t)$ provided by various diagnostic algorithms. Mathematically, in this step, one may calculate $\vec{x}(t)$ using all of the available $\vec{x}_{A_j}(t)$.

A state space model may be formulated. One may be given a set of systems exhaustive conditions $\Theta = \{\theta_1, \theta_2, \ldots, \theta_n\}$. As an example, $\theta_1, \theta_2, \ldots$ may represent various fault conditions in a large system. The exhaustivity (closed world) assumption is not necessarily fundamental because one may close any open world theoretically, by including into it an extra element $\theta_0$ corresponding to all missing or unknown conditions. One may define a set $S(\Theta)$ such that:

1. $\theta_1, \ldots, \theta_n \in S(\Theta)$;
2. If $s_i, s_j \in S(\Theta)$, then $s_i \hat{s}_j \in S(\Theta)$; and
3. No other elements belong to $S(\Theta)$, except those obtained by using rules 1 or 2.

There may be $N \Leftrightarrow 2^n - 1$ elements in $S(\Theta)$. The state of the system may be described by assigning a belief to each element in $S(\Theta)$. One may let $\vec{x}(t)$ denote the belief vector such that:

1. $\vec{x}_k(t)$ is the belief assigned to the kth element in $S(\Theta)$;
2. $\vec{x}_k(t) \geq 0, \forall k = 1, \ldots, N$; and
3. $\sum_{k=1}^{N} \vec{x}_k(t) = 1$.

$\vec{x}(t)$ may be the state vector that describes the system at time t. Here, since the elements of $S(\Theta)$ correspond to failure modes, $\vec{x}(t)$ may describe the health state. A task of knowledge fusion may be to calculate $\vec{x}(t)$ using measurements provided by various diagnostic and prognostic algorithms.

A basic premise of the present approach is to describe the health state as a stochastic process. Specifically, one may model the health states as a first order linear Markov chain. That is, $$\vec{x}(t) = F(t)\vec{x}(t-l) + w(t); t > 0, \vec{x}(0) = \vec{0}, \quad (1)$$

where matrix $F(t)$ corresponds to a dynamic evolution of the process and $w(t)$ is the process noise. In the present model, $F_{j,j}(t)$ may represent that the system health at time t will remain in that health at time $t+1$. Off diagonal elements may capture the cascade or fault propagation. For example, if $F_{j,k}(t) \neq 0$ may represent a cascade between the jth and the kth failure mode in the set $S(\Theta)$. Process noise may be assumed to be normally distributed and stationary. That is $w(t) \sim N(0,Q)$.

An algorithm model may be formulated. M algorithms assumed, where $A_i$ represents the ith algorithm. Each algorithm may have a predefined range denoted by $r(A_i)$ which describes its expertise. Algorithm $A_i$ may satisfy the following conditions.

1. $r(A_i) \subseteq S(\Theta), \forall_i = 1, 2, \ldots, M$;
2. $I(r(A_i))$ is defined as the set of singletons within the ith algorithm range;

3. $\bigcup_i^M I(r(A_i)) = \{\theta_1, \ldots, \theta_n\}$;

4. Without loss of generality, one may assume that $r(A_i)$ may be assumed to be an ordered set with respect to $S(\Theta)$ (that is, if $|r(A_i)| = N_i$ then $r(A_i)$ contains the first $N_i$ elements of $S(\Theta)$—it follows from the first condition that $N_i \leq N$);
5. At time t, algorithm $A_i$ may generate a diagnostic output $Y_{A_i}(t)$ or a basic belief assignment (bba) to elements in $r(A_i)$; and
6. A basic belief assignment from the ith algorithm may provide a noisy and partial observation of the system health state, namely, $\vec{x}(t)$ (that is, $Y_{A_i}(t)_j$ is the noisy belief assigned to the jth element of $r(A_i)$).

One may adopt a short hand notation $y^i(t)$ to denote the diagnostic output from algorithm $A_i$ at time t. Since algorithm $A_i$ provides a noisy and partial observation for the system health vector, one may have an equation, $$y^i(t) = H^i \vec{x}(t) + v(t), \quad (2)$$

where $H^i$ is a diagonal matrix and $v(t)$ is the observation noise. Stated differently, algorithm $A_i$ may provide a partial and noisy realization of the stochastic system health state vector. Since the algorithms assign a basic belief to each element in $r(A_i)$, and the system health vector is also expressed as belief, then diagonal elements of $H^i$ may be equal to one. That is, 1. $H^i_{k,k} = 1$ for $1 \leq k \leq N_i$; $H^i_{k,k} = 0, k < N_i \leq N$, and
2. $v(t) \sim N(0, R^i)$.

For the non-cascade fault case, one may interpret $F_{j,j}(t)$ as the rate at which the jth health state changes with time. Alternatively, $F_{j,j}(t) = 1$ implies an absorbing state, while $F_{j,j}(t) = 0$ implies a non-reachable state. The numerical value of $F_{j,j}(t)$ determines how fast the knowledge fusion output will reach its final value. A smaller number implies longer time, while a larger value will take shorter time. The numerical value may depend on how often the states are updated, or the sampling time. In the present case, the diagnostic state is updated whenever the diagnostic algorithms execute and provide a noisy observation. A commonly imposed Boeing Company requirement for online diagnosis is the 8 out of 10 rule. In this requirement, an algorithm should hold its output for a minimum of eight execution cycles before sending a "failed" BIT. One may adopt this requirement and use the following value for $F_{j,j}(t)$.

$$F_{j,j}(t)=0.8, \forall_j=1,\ldots,N \quad (3)$$

While $F_{j,j}(t)$ signifies the transition of remaining in the jth state, and since $F_{j,k}(t)=0$, the process noise term w(t) signifies the transition from the jth state to an unknown state. One may interpret this as a fault state that one are not aware of. Given a diagnostic algorithm $A_i$, one may be aware of $|r(A_i)|$ distinct faults. However, there may exist other failure modes $\theta_{n+1}, \theta_{n+2}, \ldots$ that this algorithm is unaware of. Clearly, there is no point in enumerating all unaware states, since the pth unaware state is indistinguishable from the qth unaware state. One may interpret w(t) as the transition to this unaware health state. The term fault coverage is used in the diagnosis literature to indicate a weighted fraction of aware and unaware states.

1. $P(\theta_k)$ may be defined as the probability of fault $\theta_k$. Typically $P(\theta_k)$ may be specified as a reciprocal called mean time to failure.
2. $I(r(A_i))$ may be defined as the set of singletons within the ith algorithm range.

3. $\Theta = \bigcup_i^M I(r(A_i)) = \{\theta_1, \ldots, \theta_n\}$ may be defined as the set of singletons. One may have $$Q_{k,k}^i = 1 - \frac{\sum_{i \in I(r(A_i))} P(\theta_i)}{\sum_{i \in \Theta} P(\theta_i)}; \forall k.$$

$R^i$ is the noise covariance matrix for diagnostic algorithm $A_i$. The kth diagonal term of this matrix is a measure of the variability algorithm $A_i$ has with respect to detecting the kth health state contained in $r(A_i)$. Often this number may be derived from part of the training process regarded as a confusion matrix. The confusion matrix may be a set of two numbers which include false positives and misses. One may make several simplifying assumptions as in the following.

1. $R_{j,k}^i = 0$, that is, variability in the belief assignment to the jth and kth state is not correlated. To some extent, virtually all diagnostic algorithms transform raw and noisy sensor data into a basic belief assignment. This assumption implies that sensor noise is uncorrelated and the transformation affects all sensors equally.

2. $R_{j,k}^i = 1 - \alpha$, $\forall k$., which implies that the variability in the belief assignment to the jth and kth states is equal. One may relax this assumption if the confusion matrix is specified for each element in $r(A_i)$, rather than for the entire set.

An aggregation scheme is noted. First, the partial state update may be dealt with. At time t>0, the system health is described using $\vec{x}(t)$. Algorithm $A_j$ may use a series of sensor measurements and generate $y^i(t)$, which is its belief for elements contained in $r(A_i)$ at the next time step. In the present simplified formulation, one may ignore the exact nature of these sensors. That is, it may suffice to say that once the vector $y^i(t)$ is known, it does not necessarily matter how the algorithm arrived at this value. In the present formulation, $y^i(t)$ may provide a noisy observation (equation (1) for the evolving system health state (equation (1)). To this end, one may adopt Kalman filtering approach to update the system health state. Since $r(A_i) \subseteq S(\Theta)$, it follows algorithm $A_i$ can update only a subset of the system health.

For algorithm $A_i$ with range $r(A_i)$ and $|r(A_i)|=N_i$, the state of the Kalman filter may be represented by two variables: 1) $\hat{x}(t-1) \Leftrightarrow \vec{x}(t-1)$ (1:Ni), which may be the estimate of the state of time t−1; and 2) P(t−1), which may be the error covariance matrix (a measure of the estimated accuracy of the state estimate). $P_0$ is a known constant.

At each step, algorithm $A_i$ may update the state using the recursive filter equations.

1. Predicted state: $\hat{x}(t|t-1)=F(t)\vec{x}(t-1)$.
2. Predicted state covariance: $P(t|t-1)=F(t)P(t-1)F(t)^T+Q(t)$.
3. Innovation or measurement residual: $r(t)=y(t)-H(t)\hat{x}(t|t-1)$.
4. Innovation or residual covariance: $S(t)=H(t)P(t|t-1)H(t)^T+R(t)$.
5. Kalman Gain: $K(t)=P(t|t-1)H(t)^T S(t)^{-1}$.
6. Updated state estimate: $x(t)=x(t|t-1)+K(t)r(t)$.
7. Update estimated covariance: $P(t)=(I-K(t)H(t))P(t|t-1)$.

The evidence aggregation may be dealt with. At each time step, algorithms $A_i$, i=1, ..., M, may provide a partial state update. One may let $(x^i(t), P^i(t))$ denote the state update provided by the ith diagnostic algorithm. It may follow from the previous section that $$(x^i(t), P^i(t))=F(\vec{x}(t-1), P^i(t-1)). \quad (5)$$

That is, the state update may be a function of the diagnostic state vector $\vec{x}(t)$ and the state covariance matrix $P^i(t-1)$. The diagnostic state at t can be calculated as a weighted average of individual algorithm updates; the weight is inversely proportional to the covariance matrix. That is:

$$\vec{x}_j(t) = \sum_{i=1}^{M} x_j^i(t)(P_{j,j}^i(t))^{-1} \quad (6)$$

The above equation will not necessarily take into account a conflict between conclusions of the algorithms. This may be especially important when the algorithms have different ranges of expertise. One may need to consider whether or not a conflict between conclusions of the algorithms is due to multiple faults occurring simultaneously, but not being accounted for due to differences in algorithm ranges. Thus, one should take into account a possibility that a set of faults $\{\wedge j^i\}$, such that $j^I \notin \{\wedge r(A_i)\}$ could be occurring simultaneously. To do that, one may provide the following approach.

One may denote sup $(x_j(t))$ as set of algorithms such that for each algorithm $A \in \sup(x_j) x_j^A \neq 0$. One may assign a non-zero belief to a state $x_j = \wedge x_{j_k}$ if $\cap \sup(x_{j_k}) = \emptyset$. State $x_j$ may be referred to as a conflict state. The nonzero belief may be calculated as an average of beliefs assigned to states $x_{j_k}$.

To identify all possible conflict states, the following iterative procedure may be performed. First, for each pair of the non-zero belief states, all two-element candidate conflict states may be determined by taking a union of two states. In each successive pass, the candidate k-element sets for a set of k states may be generated by joining (k−1)—element sets of those states, and then deleting those that contain any (k−1) subsets that were not generated in a previous pass. The process may be continued until no more sets can be generated. It should be noted that in each step, one may use domain knowledge to eliminate any sets that are known to have zero belief.

A predictive trend monitoring (PTM) simulator may be noted. A simulator may be built to demonstrate a fusion approach. This simulator may be based on a PTM application. The simulator may include of three basic building blocks, a model, a PTMD and a Stoch. The meta model may describe the functional dependencies within a typical jet engine. The PTMD may capture historical incidents recorded by the PTM program. The Stoch may capture dynamic data needed for evaluating the Stochastic knowledge fusion algorithm. Each of these building blocks is described herein.

Figure 5:
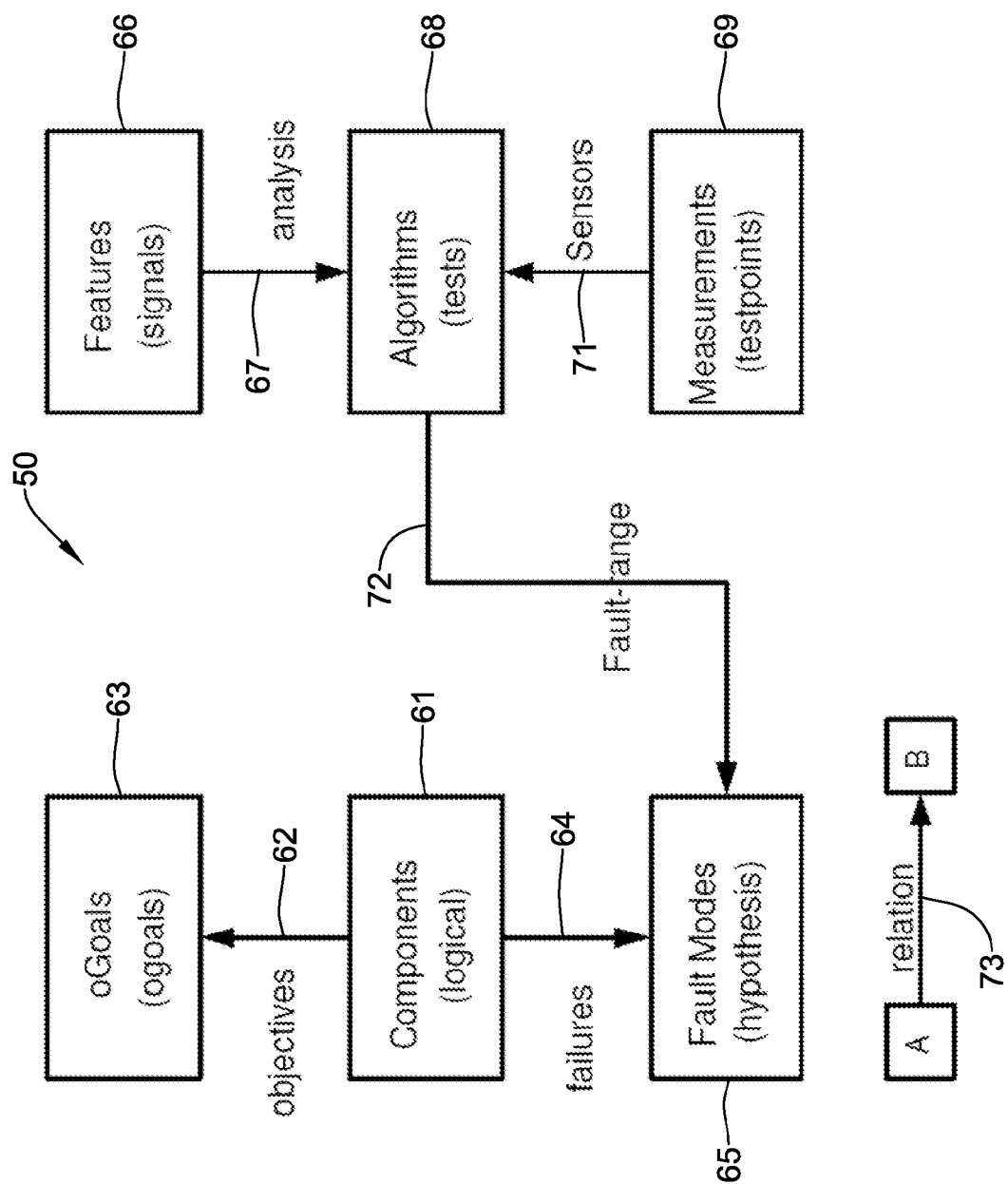
FIG. 5 is an operational block diagram of a model for the present approach.

A model may be noted. Basic elements of the model 50 are shown in a block diagram of FIG. 5. The diagram may be a model operational one. A relationship between the blocks or modules may be shown with an arrow and an associated description as shown by item 73. The terms in parentheses denote MATLAB™ variable names. A components (logical) module 61 may be connected with an outgoing arrow 62 of objectives to an oGoals (oGoals) module 63. Module 61 may also be connected with an outgoing arrow 64 of failures to a fault modes (hypothesis) module 65. A features (signals) module 66 may have an outgoing arrow 67 of analysis to an algorithms (tests) module 68. A measurements (tests) module 69 may have an outgoing arrow 71 of sensors to module 68. An outgoing arrow 72 of a fault-range may go from module 68 to module 65.

A summary of the elements and a count for each the elements of the model 50 is listed in a table of FIG. 6. There may be 121 components of a turbine with 410 failure modes. A unit that can be removed and replaced is a component. Associated with the model may be 37 algorithms, 21 measurements and 11 features. The model may be expressed as a MATLAB™ function as shown in a code 1 in the appendix.

The model may be built using an offline tool eXpress™, made available from a vendor, DSI International. This is a graphical tool that may let a user enter basic information about the physical system, which may be an engine in the present case. This model (meta data) may capture the following information.

First, the components make up the physical system. For example, components in a jet engine may include a turbine, compressor, and so forth. Often, one may hierarchically decompose the system into components and sub-components. In the PTMD project, one may stop the decomposition until one reaches a part number listed in the relevant illustrated part catalogue. That is, a component may be that which can be removed, ordered from the catalogue and replaced.

Second, oGoals may be noted. These are known as operational goals. An oGoal may capture the intended functionality of the component. For example, oGoal of the starter motor is to provide initial torque. Although this information is not necessarily used by any of the diagnostic or reasoning algorithms currently deployed within the PTMD application, it may help systematic building of the meta data model itself.

Third, fault modes may be noted. These modes may be referred to as the faults associated with each component. Each component may have more than one fault associated with it. In some sense, one may use the term "fault modes" and "failure modes" interchangeably. Fault mode information may be collected from published FMECA documents. In addition to listing the fault mode name, the model may also include the a priori likelihood of the fault.

Fourth, algorithms may be noted. They may be the diagnostic algorithms that are currently deployed within the PTMD application. The algorithms may use a variety of sensors, techniques and mathematical models. The model does not necessarily capture the details, except for the sensor used, the range of expertise and the confusion matrix generated during an offline development step.

Fifth, measurements may be noted. They are the measurements used by various diagnostic algorithms currently deployed within the PTM application. In a loose sense, the terms "measurement" and "sensor" may be interchangeably. However, measurements may include raw sensor data, derived quantities by the data acquisition system, and operator observations like smell and color. The model may contain a listing of such measurements.

Sixth, features may be noted. They may be the features used by various diagnostic algorithms deployed within the PTMD application. Examples of features may include MAX, RATE, and so forth. A feature may be a specific attribute of a sensor measurement that is being used to access the current situation. The feature might be or not be used in the application.

PTMD scenarios may be reviewed. Evidence aggregation was tested against the following scenarios collected from a PTM program. Descriptions of these scenarios are provided herein. A hot section degradation-trend based scenario may correspond to the most commonly occurring problem for an engine, namely hot section degradation. In an engine, a hot section refers to the power plant, i.e., the sub-assembly that generates power. Currently, one may have a series of algorithms that monitor the exhaust gas temperature (EGT) when the engine is delivering maximum power. The PTMD suite may also include algorithms that monitor the temperature when the engine is idling. This scenario may be used to demonstrate the basic notion of knowledge fusion, namely, an aggregation of supporting algorithms to increase belief in the power section.

Another scenario is a hot section degradation—jump based one. This scenario is similar to the hot section degradation-trend based scenario, except that here one may be monitoring a shift of jump in the exhaust gas temperature rather than the trend. Jumps in the EGT value may be caused by abrupt failures, which rules out faults with the air intake. Faults associated with the air intake tend to be more gradual. One may compare and contrast this scenario with the hot section degradation-trend based scenario to understand how knowledge fusion weighs in different features of the same sensor.

A hot section degradation—fp suppression scenario is also similar to the hot section degradation-trend based scenario. As stated herein, hot section degradation is analyzed by monitoring the EGT values during engine idling, maximum power and startup. However, in the fp—suppression scenario, algorithms monitoring EGT during startup may trigger falsely. None of the other algorithms appear to trigger. One may look for false positive suppression in this scenario. Knowledge fusion should be effective in suppressing the false alarm based on non-trigger of algorithms that monitor the EGT during idling and maximum power.

A hot section alg cba—simple clustering scenario may be to be analyzed with the hot section degradation-trend based scenario. PTMD may include a series of algorithms to monitor hot section degradation. In this scenario, all of these algorithms may trigger and provide supporting evidence. In some sense, this scenario provides an ideal case for hot section monitoring. One may look for the maximum belief under this ideal situation.

A hot section alg cba—complex clustering scenario may be analyzed with hot section alg cba—simple clustering scenario. Given an ideal condition noted in the hot section alg cba—simple clustering scenario, this scenario may calculate a delta-increase due to the addition of one more algorithm. This additional algorithm may use the same set of sensors, but uses a different technique which is clustering. An objective of this scenario is to calculate the cost benefit of adding a complex algorithm. One may look for a delta change in the belief.

A multiple fault hypothesis—debris and cooler scenario tests the ability of knowledge fusion to handle a multiple fault hypothesis. In this scenario, two failure modes may occur. One mode may be related to inlet debris and the other mode may be related to oil cooler. Two algorithms with relatively low uncertainty may assess the presence of inlet debris and oil cooler. The oil cooler algorithm may provide small evidence towards debris. One may look for the presence of two fault hypothesis in this scenario.

A multiple fault hypothesis—gen and starter scenario may also test the ability knowledge fusion to handle multiple fault hypothesis. In this scenario, the generator may be failed in addition to a failed starter. Typically both these line replaceable units may be tested during power-up and can indicate failure at the same time. Two strong algorithms may provide supporting evidence towards these fault hypotheses. One may look for the presence of two fault hypothesis in this scenario.

A dependent evidence—scv scenario may test the ability of knowledge fusion to aggregate dependent and semi-dependent evidence. A suite of three algorithms may detect problems associated with the surge control valve. All of these algorithms may use the same sensor, but use different features of the sensor. One may take a close look at the beliefs to understand how the present KF handles dependent evidence.

A dependent evidence—starter scenario may also test the ability of knowledge fusion to aggregate dependent and semi-dependent evidence. A suite of three algorithms may detect problems associated with the starter motor. Two of the algorithms may use univariate sensor tests, whereas the third algorithm may use a multivariate analysis. However, the third algorithm may use the same sensors and same features. This scenario may answer the question whether the third algorithm adds any independent evidence to knowledge fusion. The fault scenarios are summarized in a table of FIG. 7. The model may be loaded a MATLAB™ function as described in the appendix (code 2).

In reference to FIGS. 7 and 16-18, the scenarios (Scen) may be referred to numerically in that "1" is the hot section degradation—trend based, "2", is the hot section degradation—jump based, "3" is the hot section degradation—fp suppression, "4" is the hot section alg cba—simple clustering, "5" is the hot section alg cba—complex clustering, "6" is the multiple fault hypothesis—debris and cooler, "7" is the multiple fault hypothesis—gen and starter, "8" is the dependent evidences—scv, and "9" is the dependent services—starter.

Figure 8:
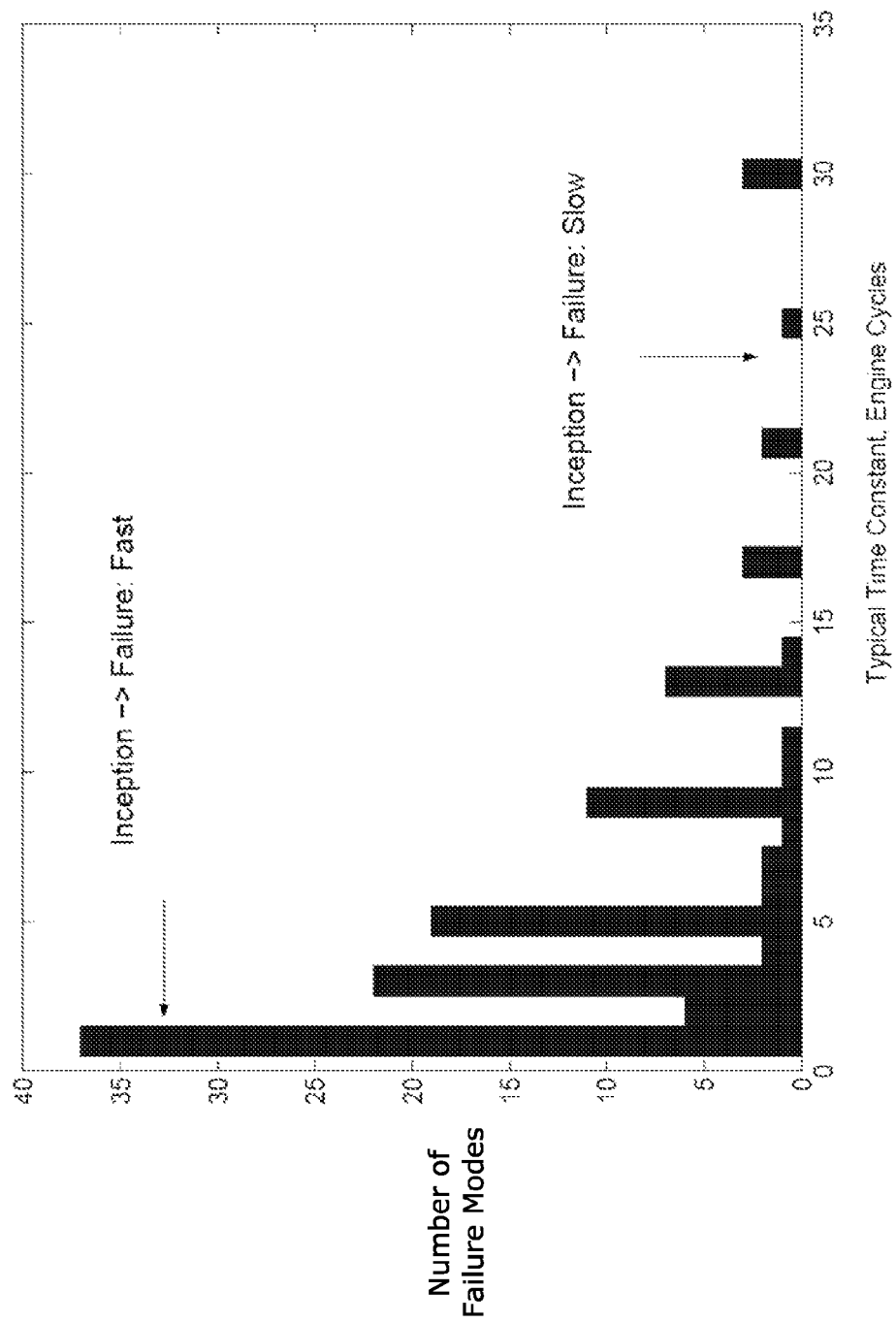
FIG. 8 is a graph of a number of failure modes versus a fault evolution time constants.
Figure 10:
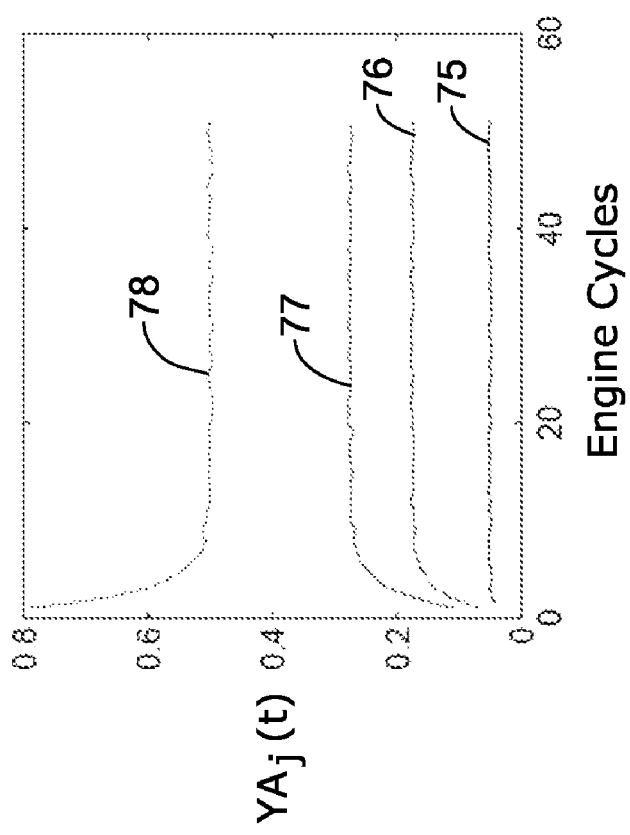
FIGS. 10-13 are graphs of diagnostic algorithm outputs for a particular scenario relevant to fault modes of a mechanism.
Figure 11:
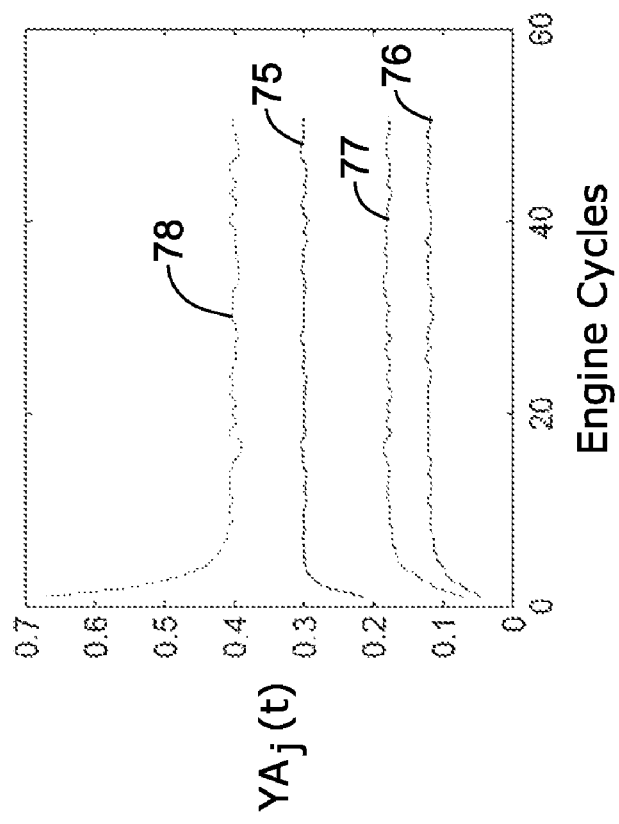
Figure 12:
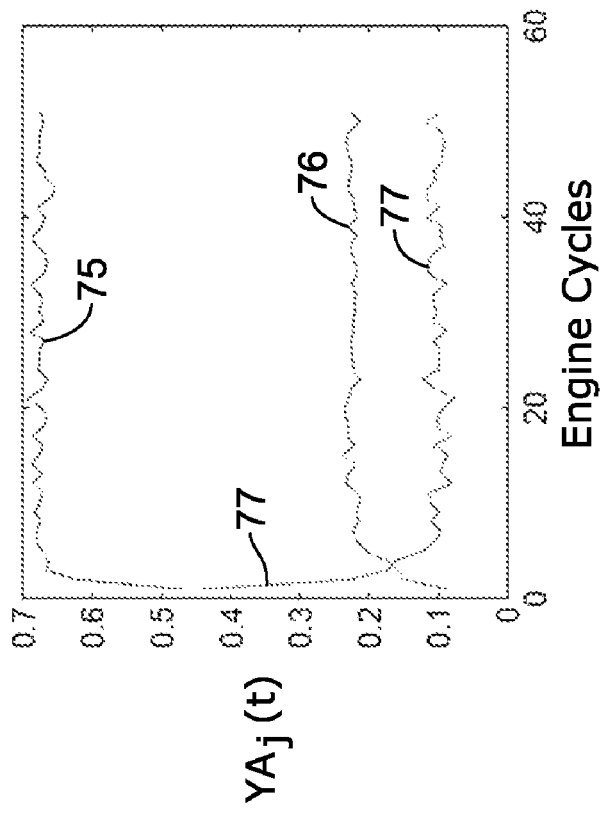
Figure 13:
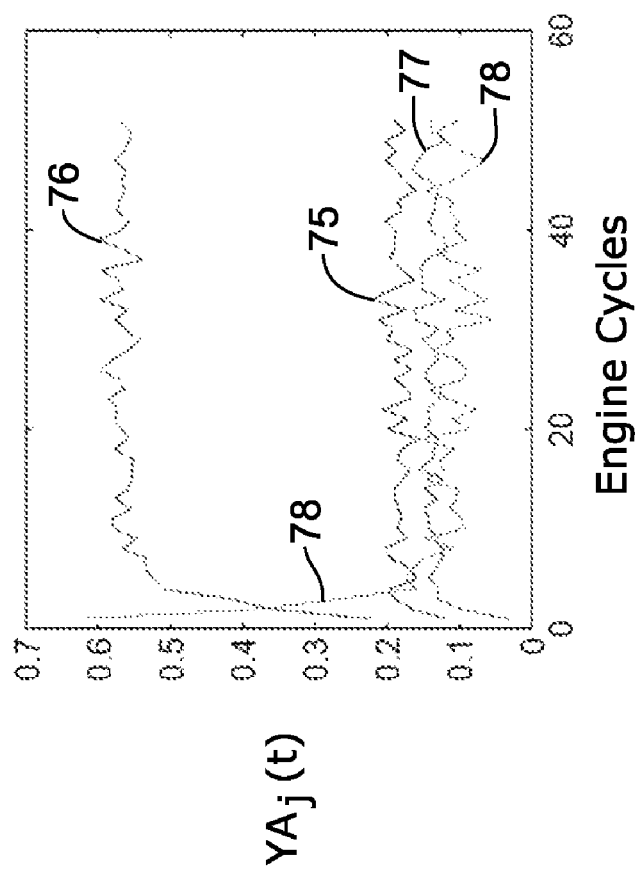

Dynamic data may be needed to simulate the evolutionary behavior of various scenarios. The dynamic behavior may in turn depend on how the underlying faults are evolving. The 410 failure modes do not necessarily evolve at the same rate. An evolution describes how the failure mode may manifest from its inception to its full failed state. This should not be confused with the onset of the failure itself or the mean time between failures. For example, load compressor heat shield crack failure mode (index=83) may initiate during the n engine cycle. However, it may take n+τ engine cycles before it is declared as a full failure. The dynamic data may capture this τ. One may contrast this with mean time between failures, which refers to the total number of engine cycles between two successive occurrences of full heat shield failure. A small τ may indicate rapidly evolving failures, while large τ value may indicate slow evolving failures. In the present approach, a number of domain experts within the involved engines division were interviewed and typical r values for all the 410 fault modes were obtained. Rather than requesting precise numbers, the question was simplified to reflect limitations imposed by the current data collection system. Within the PTMD, a measurement may be available at the end of an engine run. Consequently an algorithm $A_j$ may produce one piece of diagnostic evidence for each engine run. Hence, τ was requested with respect to engine cycles. Fast faults may manifest within one cycle, while progressive faults may evolve over series of engine cycles. FIG. 8 is a histogram that captures typical τ values (i.e., fault evolution time constants) for the 410 failure modes included in the model. The graph reveals a number of failure modes versus a typical time constant, engine cycles. A graph bar at a constant of about 1 shows an inception of a fast failure. A graph bar at a constant of about 24 shows an inception of a slow failure.

Diagnostic conclusions made by various algorithms may depend on how fast the underlying failure is evolving, the internal thresholds used by individual algorithms, and the noise introduced by the sensors being used by the algorithms. In the present approach, the algorithms may be treated as a black-box and thus the simulator would not necessarily account for the second factor. The table in FIG. 9 lists sensors and their corresponding noise for use in a simulator. The table appears to show the necessary data for dynamic information to be provided as an EXCEL™ file. This EXCEL™ file may be imported using the MATLAB™ function. Code 3 of the appendix lists the MATLAB™ import function.

A simulation drive or simulator may be run for the scenarios described for a user specified time duration. As described herein, the time t=0 may indicate an onset of a failure mode, and t=∞ may indicate a completely evolved failure. At this point, the driver does not necessarily simulate pre-failure or no-failure conditions. Although it may be relatively simple to simulate pre-failure conditions, it would provide little value in demonstrating the present aggregation scheme. Code 4 in the appendix lists the M-file that drives the scenarios. The simulation driver needs to invoke the initialize simulator function to load the simulator.

FIGS. 10, 11, 12 and 13 show output traces from various algorithms for the hot section degradation—fp suppression scenario. As the failure evolves within this scenario, diagnostic algorithms may change their belief in various fault hypotheses. Each of the traces 75, 76, 77 and 78 corresponds to a specific fault hypothesis which is not shown in the Figures. In the Figures, an X-axis represents engine cycles while the Y-axis represents $\vec{y}_{A_j}(t)$. The individual trend lines 75, 76, 77 and 78 represent the beliefs in the various fault hypotheses. A fault hypothesis index is not shown for illustrative purposes, but the each of the curves 75, 76, 77 and 78 corresponds to the same fault mode, respectively, in each subplot of the Figures. For instance, algorithms 52 and 51 of FIGS. 11 and 10, respectively, agree on the fault mode depicted by curve 78, whereas algorithm 54 of FIG. 13 appears to provide strong evidence towards the fault mode depicted by the trend line 76, and algorithm 53 of FIG. 12 appears to provide strong evidence towards the fault mode depicted by the trend line 75.

There appears to be no single dominant winner and thus a fusion scheme seems necessary to combine this evidence to a point where decisions may be made.

Simulation studies may be broadly classified into two categories, each of which is intended to evaluate the effectiveness of the present stochastic fusion approach (abbreviated as "Stoch") In the three studies, the classical Dempster-Shafer (abbreviated as "DS") fusion may be used as a baseline. Knowledge fusion may be an important step for downstream decision making—either for doing some isolation procedures or repair actions. A key metric is accuracy. If the knowledge fusion concludes that fault "A" is present, then this metric may measure the probability that the system has fault "A". The closer this number gets to 1, the more accurate is the conclusion. The knowledge fusion should make this conclusion by aggregating all of the evidence provided by various diagnostic algorithms. Accuracy may be calculated by performing a series of Monte Carlo (MC) experiments or trials described herein.

Calculation of accuracy may depend on the overall setting of an experiment. That is, I which is an index of the fault being simulated, T which is the simulation time duration [50], and M which is the number of Monte Carlo trials [200]. For each experiment, both the DS-based fusion and the stochastic fusion may generate an output matrix $\vec{x}(t)$, wherein the rows of this matrix may contain a belief in various failure modes, and the columns contained the belief as the simulation time t elapses. The next step may involve sorting the output matrix for each time t and retaining just the top 3 indexes. Then, one may count the number the fault index being simulated is present. An indicator $E_p$ may be generated for each of the Monte Carlo trials. A summary of the procedure is in the following items.

p'th trial Output: $\{\vec{x}(t)\}_p$ 0≦t≦T, p≦1≦M

Winner Index: $\{\vec{s}\,I(t)\}_p$=sort($\{\vec{x}(t)\}_p$)
select(top 3 index)

Indicator: $E_p$=count(find($\{\vec{s}\,I(t)\}$=I)), $$11 \leq t \leq T \tag{7}$$

One may then define the accuracy metric for the Ith fault scenario with the following.

$$\varsigma_1 \Leftrightarrow \frac{\sum_{p=1}^{M} E_p}{M \times (T-11)} \times 100 \tag{8}$$

Given a baseline scenario for the Ith fault, a second metric that measures the variability in the fusion output may be defined with the following.

Baseline: $\vec{x}\,0(t,I)$, 0≦t≦T p'th trial Output: $\{\vec{x}(t,I)\}_p$, 0≦t<T, p≦1≦M p'th trial Dev: $dv_p(t)=\{\vec{x}(t,I)\}_p - \vec{x}\,0(t,I)$
p'th trial Std: $S_p$=std($dv_p(t)$)
Then one may define the variability metric for the Ith fault scenario with the following.

$$\varsigma_2 \Leftrightarrow \frac{\sum_{p=1}^{M} S_p}{M} \tag{9}$$

As noted earlier, if a system has N fault modes, under a worst case scenario of all N faults occurring simultaneously, then the dimensionality of $\vec{x}(t)=2^N-1$. This number may grow rapidly and beyond modest values of N, the computational complexity may become intractable. However, if one imposes a maximum value M for number of simultaneous faults, the maximum dimensionality of the state space may be $$\sum_{i=1}^{M} \binom{N}{i},$$

where $\binom{N}{i}$ denotes the binomial term "N choose i". In simpler terms, if one allows a maximum of M simultaneous faults, then one should up all of the combinations of one simultaneous fault, two simultaneous faults, all the way till M is reached. For the Ith fault scenario, $|\vec{x}|$ may denote the number of such combinations considered by Stoch-fusion. A complexity metric may be defined with the following.

$$\varsigma_3 = \frac{|\vec{x}|}{\sum_{i=1}^{M} \binom{N}{i}} \tag{10}$$

As $\varsigma_3$ gets closer to 1, Stoch-fusion considers all possible combinations, making the in-built conflict resolution ineffective. Smaller values of $\varsigma_3$ may denote effective conflict resolution, and thus Stoch-dea is reasoning with only those fault combinations that are pertinent. $\varsigma_1$ may tell one if the Stoch-dea is indeed retaining the right only. In short, $\varsigma_3$ may be used to measure the effectiveness of the conflict resolution discussed relative to the aggregation scheme herein.

A series of Monte Carlo experiments may be performed. An experiment may be constructed by randomly varying the various factors including sensor noise, missing evidence and the PTMD scenario. As to sensor noise, random noise following a Gaussian distribution may be introduced in each sensor. The mean of this noise may be assumed to be zero and the standard deviation as listed in the table in FIG. 9. A MATLAB randn function may be used to introduce sensor noise. As a result of the noise, diagnostic evidence produced by various algorithms may vary. For the purposes of this approach, the diagnostic algorithm $A_j$ may be considered as a blackbox. Corresponding to sensor noise, at the present end, one may say noisy values for $\vec{y}_{A_j}(t)$ as depicted in FIGS. 10-13.

As to missing evidence, an objective of this approach may be to test the ability of the fusion approach to handle missing evidence. Missing evidence may be introduced as a random variable following a uniform distribution. Evidence $\vec{y}_{A_j}(t)$ produced by algorithm $A_j$ may have a $\phi$ chance of being absent. In other words, algorithm $A_j$ has a $\phi$ chance of failing during each execution cycle. $\phi$=0 indicates no failures or zero dropouts, MATLAB's rand function may be used to generate a sequence of 0/1 for a specified value of $\phi$ for each diagnostic algorithm $A_j$. "1" may indicate successful execution and thus it may produce evidence. "0" may indicate failed execution and thus no evidence at time t. In an ideal sense, the knowledge fusion should be robust relative occasional evidence dropouts caused by algorithm execution failures.

As to the PTMD scenario, each of the scenarios discussed herein may simulate different fault conditions wherein different diagnostic algorithms may provide conclusions. It should be noted that these scenarios are representative of typical behaviors seen from an online PTMD application. They may vary in complexity and thus hence it may not be reasonable to compare the hot section degradation—trend based scenario with the hot section degradation—jump based scenario. However, it may be believed that these scenarios collectively describe typical behavior and thus can be used for making generic claims about DS-based fusion and the stochastic fusion.

For a given scenario, and a φ setting, the simulator may be run to simulate the evolution of the underlying fault. Within a time window, each of the diagnostic algorithms may use its respective sensors and calculate the belief in the presence of one of more faults. The algorithm $A_j$ should generate a belief for only faults that it knows about. Variability in $\vec{y}_{A_j}(t)$ may be introduced because of sensor noise. t=0 at the start of the simulation run and stochastic fusion may generate $\vec{x}(t)$ using the aggregation scheme as described herein. The dimensionality of $\vec{x}(t)$ may change, depending on the fault scenario. FIG. 14 shows the time trace of a stochastic fusion output, namely $\vec{x}(t)$. Such trace may correspond to the hot section degradation—jump based scenario and zero dropout. Trend lines may correspond to a belief in various fault modes. As indicated in the legend of FIG. 14, the [36] trace 88 corresponds to the belief in the fault mode with an index 36 (viz., fault 36). The [41] trace 87 corresponds to the belief in the fault mode with an index 41. The [39 41] trace 85 denotes the belief in fault 39 and 41 being present in the system. Similarly, the [36 39] trace 86 denotes the belief in fault 36 and 39 being present in the system. Stated differently, [A] may denote that the corresponding fault is present by itself, whereas [A B] may denote the belief that both fault A and B are present simultaneously. For example, in the PTMD multiple fault hypothesis—gen and starter scenario, the generator is faulty and the starter motor is also faulty.

Before running a series of Monte Carlo experiments, a simpler case may be run to test multiple hypotheses testing. This approach may be designed to test the ability of stochastic fusion to handle multiple faults, rather than noisy evidences. In other words, here no sensor noise is introduced and the condition may be simulated corresponding to a fully evolved fault. This case may be derived from the PTMD multiple fault hypothesis—debris and cooler scenario and multiple fault hypothesis—gen and starter scenario. The number of faults may be reduced to eleven, and six diagnostic algorithms may be created. Three of these algorithms may provide very strong evidence towards three distinct faults with indexes 4, 7, and 11. Four scenarios may be simulated as described in the table of FIG. 15. The table shows a typical output from a Monte Carlo trial. As shown in the table, when only fault 4 is present, both the Dempster-Shafer and stochastic fusion approaches may indicate a clear winner, namely [4]. However, when fault 4 and 7 are simulated simultaneously, a superior quality of the present stochastic fusion approach appears evident. Note that in this scenario, one may expect the stochastic fusion to conclude that both faults 4 and 7 are present. That is [4 7] and not merely [4] and [7] which indicate that fault 4 or fault 7 may be present. The stochastic fusion approach considers the case of multiple faults being present. Although belief in [4 7] is not the maximum, it nevertheless is a top 3rd candidate. The utility of the stochastic fusion approach appears clear. Since one may have 11 fault modes, there is a $2^{11}-1$ possible combinations. Out of these combinations, Stoch fusion not only may pick the correct combination, but also the belief in this combination may bubble up to the top. DS-fusion on the other hand does not appear to make this conclusion. As stated herein, 2 algorithms provide very strong evidence towards fault 4 and fault 7 individually. The DS approach appears unable to resolve this direct conflict, and among the 2 strong algorithms, the slightly stronger algorithm has an edge. This is evident by the belief assigned to [4] and [7]. This example highlights a present ability to resolve conflict as well as manage the combinatorial complexity. The next scenario illustrates the same theme, when fault 4 is present along with fault 11. Similar results may hold true for 3 simultaneous faults 4,7,11 as shown in the table of FIG. 15.

It appears evident that Stoch-based fusion is able to resolve conflict successfully and handle multiple faults. A question is how efficient was this conflict resolution may be. This is where one may look at the $\zeta_3$ metric. A table in FIG. 16 lists the complexity metric for various scenarios. As noted herein, smaller values of $\zeta_3$ are desired. As indicated in the FIG. 16, the maximum number of simultaneous fault hypotheses is fixed to 3 to illustrate the computational attractiveness of the Stoch-based fusion. The conflict resolution has ability to limit the number of combinations, and as shown herein, these combinations appear accurate. On an average, just 16 percent of all possible combinations were considered, providing a ten-fold decrease in the computational complexity. One may conclude that Stoch-based fusion is able to handle multiple faults as well as manage the combinatorially exploding state space using conflict resolution. Another question is how the Stoch-based fusion performs with respect to its accuracy. Here is where one may look at the $\zeta_1$ metric. A table in FIG. 17 lists the accuracy metric for various scenarios and compares the Stoch-based fusion with the classical DS-based fusion. As noted herein, it is desired that $\zeta_1 \rightarrow 1$. As one runs several MC trials, it may be noted that the average accuracy for both Stoch and DS based fusion deviate from 1. However, $\zeta_1$ deteriorates rapidly for DS-based fusion as one begins to loose evidence. That is, when φ=0.2, DS-based fusion appears about 62 percent accurate. In other words, in only 87 out of 100 times, DS-based fusion appears able to correctly identify the underlying fault. Also, DS-based fusion failed for the scenarios of the multiple fault hypothesis—debris and cooler scenario and the multiple fault hypotheses—gen and starter, which contained multiple faults. If one ignores these two scenarios and recalculates $\zeta_1$ for DS-fusion, then the accuracy increases to 79.73, which is still smaller than the corresponding number for Stoch-based fusion.

A casual look at FIG. 17 may indicate that Stoch-based fusion may have less accuracy than DS-based fusion. Although the numbers appear to indicate such, this conclusion may be misleading. The aggregations used by DS and Stoch are different and thus a comparison of dissimilar approaches in this sense does not appear appropriate. An important point is the ability of Stoch-based fusion to handle multiple faults as well as have more graceful of performance as one begins to lose more evidence. It is expected that the performance of any fusion method may decrease as the quality of the evidence degrades. Stoch-based fusion appears to bring a more graceful degradation and thus permits one to provide tighter bounds on real-life situations. A significance of the filtering component of Stoch-dea is highlighted by the results shown in FIG. 17.

As noted herein, it appears evident that accuracy of Stoch-based fusion degrades slowly compared to DS-based fusion. A question, in the cases where Stoch-based fusion appears accurate, is how much the belief varies. For an answer, one may look at the $\zeta_2$ metric. Ideally, one would like $\zeta_2 \rightarrow 0$. However, this will not happen since sensors contain noise and the quality of the evidence deteriorates. A table in FIG. 18 provides empirical evidence for the existence of δ in a Stoch-based fusion. It appears that one cannot establish a limit using theoretic derivations. FIG. 18 shows that the $\zeta_2$ values for Stoch-based fusion appear consistently smaller than those for DS-based fusion. By definition, since $\zeta_2$ is calculated only when the algorithm is accurate, it appear not applicable (n/a) for DS-based fusion relative to scenarios containing multiple faults.

$\zeta_2$ appears to increase as the quality of evidence deteriorates (as may be simulated by increasing values of φ). One may identify an upper bound δ such that $$\zeta_2 \leq \delta, \forall \phi \leq \phi^{max}, \forall \text{ scenarios.} \qquad (11)$$

Based on experimental studies, one could establish an empirical bound. FIG. 19 shows the values of $\zeta_2$ as a function of φ. From an appearance of the trend line, existence of an upper bound for $\zeta_2$ seems plausible. However, it appears that one can not derive such a limit based on theoretical considerations.

Multiple hypotheses management is an important factor in automatic or manual decision making. Such management may range from a military field analyst trying to explain a series of pieces of surveillance evidence, or a business analyst trying to explain potential malfunction using a series of pieces of financial evidence. The present fusion approach may be extended beyond the diagnostic decision making examples discussed herein. A decision making process that involves multiple evidences which evolve over time is a suitable candidate for the present fusion approach. Such evidence may come from online or offline diagnostic algorithms monitoring a jet engine, a complex refinery process, or other items. Simulation studies may show the ability of the present approach to handle noisy as well as intermittent evidence using a filtering scheme, manage combinatorial complexity by pruning the hypotheses state space using the concept of conflict resolution, and aggregate overlapping evidence using an averaging scheme.

In the present specification, some of the matter may be of a hypothetical or prophetic nature although stated in another manner or tense.

Although the invention has been described with respect to at least one illustrative example, many variations and modifications will become apparent to those skilled in the art upon reading the present specification. It is therefore the intention that the appended claims be interpreted as broadly as possible in view of the prior art to include all such variations and modifications

Appendix

Inventors: V. Guralnik; D. Mylaraswamy

Code 1: M-Function for importing the PTM Model

INITIALIZE_SIMULATOR;
[model] = INITIALIZE_SIMULATOR;

Initialize the simulator. Initialization involves creating
 1. 'model' structure that contains all the relevant information from systematic
 approach for diagnostic. This information is exported from the DSI eXpress model as a
 series of TXT and CSV files.

The model structure contains the following fields with the significance as
listed below:
model.logical    ...... Logical components in the system
model.ogoals     ....... Operational goals or functions
model.hypothesis ... Failure modes for the system
model.signals    ...... Features or signals tracked in the system
model.testpoints ... Measurements or sensors available in the system
model.tests      ........ Diagnostic algorithms available Each of these attribute is a structure array. Type in disp(model.<field>) to get
details regarding each structure. Relations within the systematic model are maintained
using GUID.

The model information is specified in the following data files. All these files
MUST exist on MATLAB's search path for this function to work. This function is not
robust to non existence of these files.

Design_Data.txt    ....... Basic design information. This includes the hierarchy, failure
                           modes and failure rates Algorithm_Data.txt  .... Algorithm data. This includes methods & performance metrics like
                           detection rate and false positives AlgMapping_Data.csv ... Algorithm range. This is a fragile mapping between the algorithm
                           GUID and the failure mode GUID.
Algorithm_bba.csv   ..... Basic Belief assignment data. This is a fragile mapping between
                           the algorithm GUID and the bba values for each failure
                           hypothesis.

---

Code 2: M-Function for importing the PTM Scenarios

INITIALIZE_SIMULATOR;
[model, ptmd] = INITIALIZE_SIMULATOR;

Initialize the simulator. Initialization involves creating
 1. 'model' structure that contains all the relevant information from
    systematic approach for diagnostic. This information is exported from
    the DSI eXpress model as a series of TXT and CSV files.
 2. 'ptmd' structure that contains historic data from the PTMD application.
    his information is synthesized based on how the current PTMD web-based application has performed over the past 3 years.

The ptmd structure contains the following fields with the significance as listed
below:
ptmd.scenarios  ...... PTMD application scenarios
ptmd.format   ........ 1: supports existing PTMD KF, 2: present PTMD KF,
                       3: contains dynamic information.

The ptmd information is specified in the following data files.  All
these files MUST exist on MATLAB's search path for this function to
work. This function is NOT robust to non existence of these files.
scenario_data.txt  ..... Algorithm trigger data. This is a fragile mapping between the
                        algorithm GUID that provides supporting and discounting
                        evidences.

----------------------------------------

Code 3: M-Function for importing the Dynamic Data

INITIALIZE_SIMULATOR;
[model, ptmd, stoch] = INITIALIZE_SIMULATOR;

Initialize the simulator. Initialization involves creating
  1. 'model' structure that contains all the relevant information from
     systematic approach for diagnostic. This information is exported from
     the DSIeXpress model as a series of TXT and CSV files.
  2. 'ptmd' structure that contains historic data from the PTMD application.
     This information is synthesized by D. Mylaraswamy based on how the
     current PTMD web-based application has performed over the past 3 years.
  3. 'stoch' structure contains data for dynamic simulation of the PTM
     algorithms. This information is derived based on fault evolution
     dynamics.

The dynamic data is specified in the following data files. All these
files MUST exist on MATLAB's search path for this function to work. This
function is NOT robust to non existence of these files.

DynamicData.xls  ....... Data for dynamic behavior of various faults and fault groups.
                         This also contains normalized sensor noise levels.

Successful initialization will create the following three MAT file
'model.mat', 'ptmapp.mat' and 'stochapp.mat' in your working directory. If the MAT file
exists, then initialization simplifies to loading the MAT file.

----------------------------------------

Code 4: M-Function for generating data for a specified scenario

[ts, dout, algIndex] = SIMULATION_DRIVER(scenario, timeDuration);

Driver for the PTM simulator. This driver function invokes the PTM simulator for
the given scenario and given time duration.

Inputs:
  scenario  ....... Scenario index.
  timeDuration  .... Duration for the simulation run.

Outputs:

```
ts  ............ Time stamp vector. ts(end) = inf.
dout  ........... Cell array of algorithm output matrix.
algIndex  ....... Array of algorithm index.
``` dout is a cell array. dout{k} is the output matrix from the k'th algorithm, whose index is given by algIndex(k).

Each element of dout{k} is a NxM matrix. N = number of rows, the i'th row corresponds to the output generated by the algorithm at time ts(i). The last row corresponds to the steady state output from the algorithm, that is ts(end). Note that ts(end) = inf.
M = number of columns. The j'th column is the belief for the j'th fault hypothesis. The last column contains the THETA value.

----------------------------------------

What is claimed is:

1. An information fusion system comprising;
   at least two diagnostic algorithms for providing belief values about a failure mode of a mechanism;
   a filter for receiving the belief values from the diagnostic algorithms and providing smoothed belief values; and
   an aggregator for aggregating the smoothed belief values into at least one diagnostic state; and
   wherein:
   one diagnostic algorithm is coupled to a diagnostic module comprising a demultiplexer having an output connected to an input of the filter;
   another diagnostic algorithm is coupled to an aggregation module having an input connected to an output of the filter;
   the filter is a Kalman filter; and
   the filter is for smoothing noise in the belief values provided by the diagnostic algorithms;
   the filter uses a diagnostic state at time t−1 to smooth out noise in the belief value provided by a diagnostic algorithm at time t;
   the aggregating the smoothed belief values from the filter takes into account a conflict among evidence provided by the diagnostic algorithms; and
   multiple failure mode hypotheses are generated by taking a pair-wise union of elements in the conflict and iteratively taking pair-wise unions of multiple failure hypotheses generated during a previous iteration.

2. The system of claim 1, wherein the diagnostic state indicates an overall belief value about the failure mode.

3. The system of claim 1, wherein the belief values are provided for particular instances of past and/or present time by the diagnostic algorithms.

4. The system of claim 1, wherein the filter is for filling a gap in belief values resulting from occasional drop-outs in the belief values provided by the diagnostic algorithms.

5. The system of claim 1, wherein the filter is for accounting for a propagation of faults within the mechanism.

6. The system of claim 1, wherein the filter uses a diagnostic state at time t−1 resulting from the aggregating.

7. The system of claim 1, wherein the conflict among the evidence is resolved by generating multiple failure mode hypotheses.

8. The system of claim 7, wherein the multiple failure mode hypotheses cover two or more failures occurring simultaneously.

9. The system of claim 7, wherein some multiple failure mode hypotheses are restricted relative to prior knowledge about failure mode probabilities.

10. The system of claim 1, wherein a diagnostic state for single and/or multiple failure mode hypotheses set is calculated by a weighted averaging of smoothed belief values.

11. The system of claim 1, wherein the aggregating is of data from a stochastic process.

12. An evidence aggregation system comprising:
    a diagnostic module;
    a filter connected to an output of the diagnostic module; and
    an aggregation module connected to an output of the filter; and
    wherein:
    the diagnostic module comprises:
    a delay operator; and
    a demultiplexer connected to the delay operator and the filter;
    the delay operator has an input for receiving an initial diagnostic state;
    the delay operator has an output for providing a time delayed diagnostic state to the demultiplexer;
    the demultiplexer has an output for providing selected diagnostic state information to the filter;
    the filter is for providing belief values to the aggregation module;
    the aggregation module is for providing diagnostic states; and
    a diagnostic state is related to a failure mode of an observed mechanism.

13. A method for fusing information comprising:
    obtaining belief values via a diagnostic module comprising a demultiplexer about one or more failure modes of a stochastic system;
    filtering the belief values into smoothed belief values; and
    aggregating the smoothed belief values into at least one diagnostic state about the system; and wherein
    the filtering for filling a gap in belief values resulting from occasional drop-outs in the belief values provided by the diagnostic algorithms;
    the filter is for accounting for a propagation of faults within the mechanism; and
    a diagnostic state for single and/or multiple failure mode hypotheses set is calculated by a weighted averaging of smoothed belief values.

* * * * *